US011455890B2

(12) United States Patent
Yang et al.

(10) Patent No.: US 11,455,890 B2
(45) Date of Patent: Sep. 27, 2022

(54) TRAFFIC-ADAPTIVE DEPLOYMENT OF VEHICLE FUNCTIONS

(71) Applicant: Toyota Motor Engineering & Manufacturing North America, Inc., Erlanger, KY (US)

(72) Inventors: Hao Yang, Aliso Viejo, CA (US); Kentaro Oguchi, Mountain View, CA (US)

(73) Assignee: TOYOTA MOTOR ENG & MFG NORTH AMERICA, INC., Plano, TX (US)

( * ) Notice: Subject to any disclaimer, the term of this patent is extended or adjusted under 35 U.S.C. 154(b) by 51 days.

(21) Appl. No.: 16/827,196

(22) Filed: Mar. 23, 2020

(65) Prior Publication Data

US 2021/0295705 A1    Sep. 23, 2021

(51) Int. Cl.
| | |
|---|---|
| *G08G 1/00* | (2006.01) |
| *G01C 21/34* | (2006.01) |
| *G08G 1/01* | (2006.01) |
| *G08G 1/09* | (2006.01) |
| *G08G 1/052* | (2006.01) |

(52) U.S. Cl.
CPC ........... *G08G 1/20* (2013.01); *G01C 21/3407* (2013.01); *G08G 1/012* (2013.01); *G08G 1/0104* (2013.01); *G08G 1/0145* (2013.01); *G08G 1/052* (2013.01); *G08G 1/091* (2013.01); *G08G 1/093* (2013.01)

(58) Field of Classification Search
CPC ........ G08G 1/20; G08G 1/0104; G08G 1/093; G08G 1/0145; G08G 1/091; G08G 1/012; G08G 1/052; G01C 21/3407
See application file for complete search history.

(56) References Cited

U.S. PATENT DOCUMENTS

| | | | | |
|---|---|---|---|---|
| 8,315,784 | B2 * | 11/2012 | Endo ................ | G08G 1/096827 701/117 |
| 10,157,363 | B2 * | 12/2018 | Skaaksrud | .......... H04L 41/0813 |
| 10,343,695 | B2 * | 7/2019 | Fawaz | .................. H04L 67/125 |
| 2002/0122406 | A1 * | 9/2002 | Chillariga | .............. H04B 1/715 370/347 |
| 2003/0051042 | A1 | 3/2003 | Tazoe | |
| 2006/0223529 | A1 * | 10/2006 | Yokota | ................. G08G 1/0104 455/433 |
| 2008/0077316 | A1 * | 3/2008 | Yamane | ............. G01C 21/3694 701/119 |

(Continued)

OTHER PUBLICATIONS

Mehta, A. et al., Utility-based allocation of industrial IoT applications in mobile edge clouds, Umea University, DiVA, 2018 (10 pages).

*Primary Examiner* — Dale W Hilgendorf
(74) *Attorney, Agent, or Firm* — VLP Law Group LLP; Michel Bohn

(57) ABSTRACT

In an example, a method receives vehicle data for a plurality of vehicles associated with a geographic region. The method determines, based on the vehicle data, a connected vehicle status of the geographic region. The connected vehicle status reflects an estimated number of connected vehicles in the geographic region at a point in time. The method determines, based on the estimated number of connected vehicles, one or more vehicle functions to be deployed by a server associated with the geographic region. The method deploys, by the server, the one or more vehicle functions.

20 Claims, 9 Drawing Sheets

(56) References Cited

U.S. PATENT DOCUMENTS

| | | | |
|---|---|---|---|
| 2012/0268295 A1* | 10/2012 | Yuse | G01C 21/3691 |
| | | | 340/905 |
| 2015/0046591 A1 | 2/2015 | Zhu et al. | |
| 2017/0255966 A1* | 9/2017 | Khoury | H04L 67/20 |
| 2018/0063002 A1* | 3/2018 | Filley | G08G 1/04 |
| 2019/0265703 A1 | 8/2019 | Hicok et al. | |
| 2019/0311614 A1* | 10/2019 | Yang | G05D 1/0246 |
| 2019/0322367 A1* | 10/2019 | El Idrissi | G08G 5/0069 |
| 2019/0383627 A1* | 12/2019 | Nangeroni et al. | |
| | | | G01C 21/3461 |
| 2020/0211399 A1* | 7/2020 | Zhang | G08G 1/096725 |
| 2020/0269875 A1* | 8/2020 | Wray et al. | G01C 21/3407 |
| 2020/0312133 A1* | 10/2020 | Wang | G08G 1/096741 |
| 2020/0346666 A1* | 11/2020 | Wray | G01C 21/3407 |
| 2020/0351205 A1* | 11/2020 | Filley | G08G 1/0141 |
| 2021/0227347 A1* | 7/2021 | Bizzarri | H04W 4/021 |
| 2022/0131805 A1* | 4/2022 | Reimann | H04W 4/40 |

* cited by examiner

TRAFFIC-ADAPTIVE DEPLOYMENT OF VEHICLE FUNCTIONS

BACKGROUND

The present disclosure relates to deployment of vehicle functions, and in a more particular example, relates to traffic-adaptive deployment of vehicle functions.

Today, some modern systems rely on servers to support various operations of connected vehicles. For example, a server may process and respond to various requests of the connected vehicles. However, these existing systems often require the connected vehicles to initiate the requests, and the server may then respond to the requests of the connected vehicles in reactive manner. This approach usually results in high latency in responding to the requests of the connected vehicles, and thus it is generally impractical or impossible for these systems to be implemented in vehicular context. Furthermore, these existing systems are usually inefficient in utilizing the computational resources of the server, especially when the demand from the connected vehicles often drastically changes over time due to the high mobility of connected vehicles. For example, the computational resources of the server may be underutilized when the traffic in the area covered by the server is relatively low. On the other hand, the computational resources of the server may become insufficient to serve a large number of connected vehicles in the area at a later time when the traffic quickly gets busy.

SUMMARY

The subject matter described in this disclosure overcomes the deficiencies and limitations of the existing solutions by providing novel technology for deploying vehicle functions for connected vehicles.

According to one innovative aspect of the subject matter described in this disclosure, a method comprises: receiving vehicle data for a plurality of vehicles associated with a geographic region; determining, based on the vehicle data, a connected vehicle status of the geographic region, the connected vehicle status reflecting an estimated number of connected vehicles in the geographic region at a point in time; determining, based on the estimated number of connected vehicles, one or more vehicle functions to be deployed by a server associated with the geographic region; and deploying, by the server, the one or more vehicle functions.

In general, another innovative aspect of the subject matter described in this disclosure may be embodied in a system comprising: one or more processors; and one or more memories storing instructions that, when executed by the one or more processors, cause the system to perform operations including: receiving vehicle data for a plurality of vehicles associated with a geographic region; determining, based on the vehicle data, a connected vehicle status of the geographic region, the connected vehicle status reflecting an estimated number of connected vehicles in the geographic region at a point in time; determining, based on the estimated number of connected vehicles, one or more vehicle functions to be deployed by a server associated with the geographic region; and deploying, by the server, the one or more vehicle functions.

In general, another innovative aspect of the subject matter described in this disclosure may be embodied in a system comprising: means for receiving vehicle data for a plurality of vehicles associated with a geographic region; means for determining, based on the vehicle data, a connected vehicle status of the geographic region, the connected vehicle status reflecting an estimated number of connected vehicles in the geographic region at a point in time; means for determining, based on the estimated number of connected vehicles, one or more vehicle functions to be deployed by a server associated with the geographic region; and means for deploying, by the server, the one or more vehicle functions.

These and other implementations may each optionally include one or more of the following features: that deploying the one or more vehicle functions includes computing, by the server prior to the point in time, an operating parameter for a first vehicle function from the one or more vehicle functions, the first vehicle function associated with a first connected vehicle from the plurality of vehicles; that determining that the first connected vehicle is within the geographic region, and transmitting function data including the operating parameter associated with the first vehicle function to the first connected vehicle for executing the first vehicle function based on the operating parameter; that the first vehicle function and the operating parameter associated with the first vehicle function include one or more of the first vehicle function is a function to minimize travel time and the operating parameter includes one or more of an average roadway speed associated with one or more road segments, an average lane speed associated with one or more lanes, and a traffic signal duration associated with one or more intersections, and the first vehicle function is a function to increase traffic safety and the operating parameter includes one or more of a driving pattern or a driving score of one or more vehicles located on the one or more road segments, and a situation location and an impact zone of one or more traffic situations in the geographic region; that determining the connected vehicle status of the geographic region includes estimating a vehicle dynamic of a first connected vehicle in the geographic region, and deploying the one or more vehicle functions includes computing function data for a first vehicle function associated with the first connected vehicle based on the estimated vehicle dynamic of the first connected vehicle in the geographic region; that the estimated vehicle dynamic of the first connected vehicle includes one or more of a travel path of the first connected vehicle in the geographic region, an estimated vehicle speed and an estimated vehicle location of the first connected vehicle in the geographic region at one or more timestamps; that the plurality of vehicles associated with the geographic region includes one or more vehicles located in the geographic region and one or more vehicles located within a predefined distance from the geographic region, and determining the connected vehicle status of the geographic region includes determining, based on the vehicle data associated with the plurality of vehicles, one or more connected vehicles that will be in the geographic region at the point in time, wherein the point in time is a future point in time, and determining the estimated number of connected vehicles in the geographic region at the point in time based on the one or more connected vehicles; that determining the connected vehicle status of the geographic region includes estimating, based on the vehicle data associated with the plurality of vehicles, a future traffic condition of one or more road segments associated with the geographic region, receiving trip data of a first connected vehicle in the plurality of vehicles, the trip data including a vehicle route and a departure time of the first connected vehicle, and estimating, based on the future traffic condition of the one or more road segments and the trip data of the first connected vehicle, one or more of an enter time, an exit time, a serving duration, and a vehicle dynamic of the first connected vehicle in the geographic region; that determining one or more first vehicle functions for one or more connected vehicles in the geographic region of the server at the point in time, determining a priority level for a first vehicle function in one or more first vehicle functions based on one or more of a number of first connected vehicles associated with the first vehicle function in the geographic region at the point in time, an enter time and a serving duration in the geographic region of a first connected vehicle associated with the first vehicle function, a vehicle priority metric of the first connected vehicle and an urgency metric of the first vehicle function, and determining, from the one or more first vehicle functions, the one or more vehicle functions to be deployed by the server based on the priority level of the first vehicle function; that determining the one or more vehicle functions to be deployed by the server includes determining that a second vehicle function is not deployed by the server based on a priority level of the second vehicle function, and requesting one or more second connected vehicles associated with the second vehicle function to select one or more of a different option of the second vehicle function and a different vehicle function.

Other implementations of one or more of these and other aspects include corresponding systems, apparatus, and computer programs, configured to perform the actions of methods, encoded on non-transitory computer storage devices.

The novel technology for adaptively deploying vehicle functions for connected vehicles based on traffic condition in this disclosure is particularly advantageous in a number of respects. For example, the technology described herein may estimate a future traffic condition of various road segments, and predictively determine a connected vehicle status describing connected vehicles that will be in a geographic region of a server at a future point in time based on the future traffic condition. The present technology may determine vehicle functions likely requested or executed by these connected vehicles, and compute function data for these potential vehicle functions prior to the future point in time. As a result, the present technology can proactively deploy the potential vehicle functions for the upcoming connected vehicles beforehand, thereby reducing the computational latency in providing the function data for executing the vehicle functions to the connected vehicles when the connected vehicles are within the geographic region. Thus, the quality performance and the reliability of the server in serving the connected vehicles can be improved. Furthermore, the technology described herein enables the server to utilize the available resources of the server to compute the function data for the vehicle functions that are likely requested or executed by the upcoming connected vehicles. Thus, the efficiency of the server in utilizing its resources can also be improved.

It should be understood that the foregoing advantages are provided by way of example and that the technology may have numerous other advantages and benefits. The disclosure is illustrated by way of example, and not by way of limitation in the figures of the accompanying drawings in which like reference numerals are used to refer to similar elements.

DESCRIPTION

Figure 1:
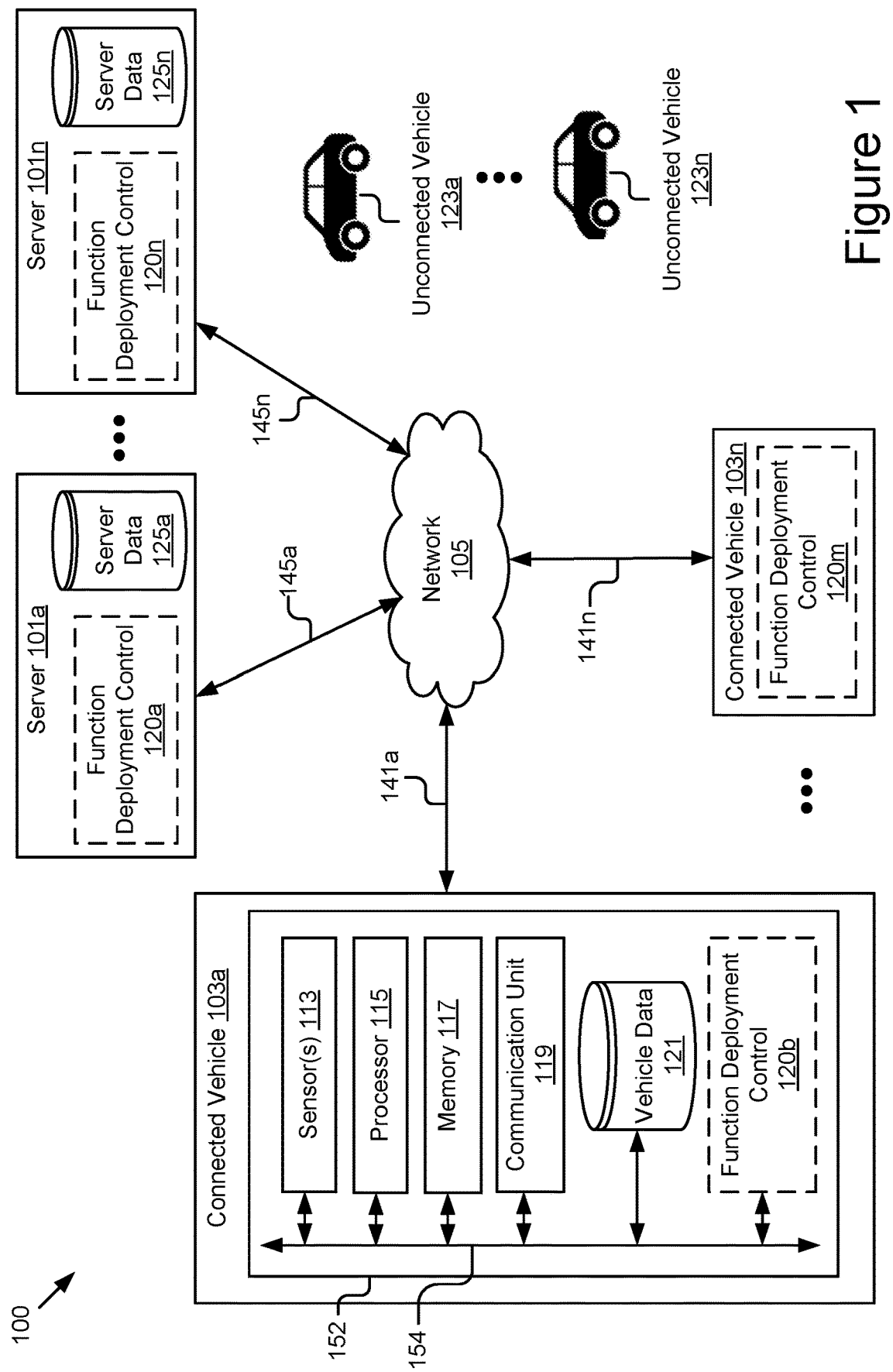
FIG. 1 is a block diagram of an example system for deploying vehicle functions for connected vehicles.

The technology described herein can predictively determine a connected vehicle status describing connected vehicles in a geographic region of a server at a point in time (e.g., a future point in time) based on traffic conditions, and deploy vehicle functions likely requested or executed by these connected vehicles using available resources of the server in advance. As a result, the present technology can reduce computational latency in providing function data associated with the vehicle functions to the connected vehicles when the connected vehicles are within the geographic region, thereby improving the reliability of the server in serving the connected vehicles as well as improving the efficiency in utilizing the available resources of the server. As described in further detail below, the technology includes various aspects, such as function deployment methods, systems, computing devices, computer program products, and apparatuses, among other aspects.

To support various operations of connected vehicles, physical and/or virtual central/local servers may be used to provide the computing capability and the communication reliability for the connected vehicles. Each server may provide its services for the connected vehicles in a certain geographic region, and the workload of the server may drastically change over time due to the traffic condition of the road segments in its geographic region. The present technology provides a traffic-adaptive function deployment system for the servers to proactively process traffic information and function data for the upcoming connected vehicles approaching their geographic region. The system may collect vehicle dynamics, trip data, vehicle preference, etc., of the connected vehicles as well as roadway infrastructure of various road segments to predict the number of connected vehicles and the serving duration of these connected vehicles within the geographic region of each server. The system may determine the vehicle functions potentially requested by these connected vehicles based on their vehicle preference, and preliminarily determine the traffic information needed to support these vehicle functions. Each vehicle will receive its desired service with the pre-processed traffic information when the vehicle enters the geographic region of the server. Thus, the servers can serve the connected vehicle more accurately and reliably with lower latency.

As discussed above, the system may consider traffic condition (e.g., current traffic condition and future traffic condition) and proactively select and activate vehicle functions of each server for the upcoming connected vehicles based on the number of connected vehicles and the vehicle preference of these connected vehicles. As a result, the servers can provide services for the connected vehicles in timely manner and can predict the most appropriate set of vehicle functions to better serve all the upcoming connected vehicles approaching the geographic regions of the servers.

An example system for deploying vehicle functions for connected vehicles may receive vehicle data for a plurality of vehicles associated with a geographic region. The plurality of vehicles may include one or more vehicles located within the geographic region, and one or more vehicles located within a predefined distance from the geographic region. The geographic region may be associated with a server, and the server can provide or facilitate the execution of various vehicle functions for the connected vehicles located in the geographic region. In some embodiments, the system may determine a connected vehicle status of the geographic region based on the vehicle data of the plurality of vehicles. The connected vehicle status may describe one or more connected vehicles in the geographic region at a point in time (e.g., a future point in time), and may reflect an estimated number of connected vehicles in the geographic region at the point in time. For each connected vehicle in the geographic region at the point in time, the connected vehicle status may include an enter time, an exit time, a serving duration, and one or more vehicle dynamics in the geographic region being estimated for the connected vehicle.

In some embodiments, the system may determine one or more vehicle functions to be deployed by the server based on the connected vehicle status of the geographic region and function preference of the connected vehicles in the geographic region at the point in time. In some embodiments, the server may deploy the vehicle functions for the connected vehicles in advance. For example, the server may compute function data for a first vehicle function associated with a first connected vehicle prior to the point in time using the vehicle dynamics in the geographic region that are estimated for the first connected vehicle. Thus, when the first connected vehicle is within the geographic region, the function data of the first vehicle function can be transmitted to the first connected vehicle with minimum delay to execute the first vehicle function based on the function data.

FIG. 1 is a block diagram of an example system 100 for deploying vehicle functions for connected vehicles. As shown, the system 100 includes one or more servers 101a . . . 101n, one or more connected vehicles 103a . . . 103n, and one or more unconnected vehicles 123a . . . 123n. The servers 101a . . . 101n and the connected vehicles 103a . . . 103n may be coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of connected vehicles 103, unconnected vehicles 123, servers 101, or networks 105.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunication network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the server(s) 101 and the connected vehicle(s) 103, it should be understood that the network 105 may in practice comprise any number of combination of networks, as noted above.

The connected vehicle 103 may be a vehicle platform that is capable of communicating with other computing entities of the system 100, and thus the connected vehicle 103 can transmit and receive data to and from other computing entities of the system 100. For example, the connected vehicle 103 may transmit and receive sensor data, vehicle dynamics, etc., to and from other connected vehicles 103. In another example, the connected vehicle 103 may transmit trip data, vehicle dynamics, requests associated with various vehicle functions, etc. to the server 101, and receive vehicle instructions, function data associated with vehicle functions, etc., from the server 101. On the other hand, the unconnected vehicle 123 may be a vehicle platform that lacks the capability of communicating with other computing entities, or has such capability but is restricted from or incapable of using it due to various reasons (e.g., system errors, power loss, opt-out settings, etc.). Therefore, the unconnected vehicle 123 may be non-responsive and unable to transmit and receive data to and from other computing entities of the system 100. The connected vehicles 103 and the unconnected vehicle 123 may be commonly referred to herein as vehicle(s), and these vehicles are capable of transporting from one point to another. Non-limiting examples of the vehicle include an automobile, a bus, a boat, a plane, a bionic implant, a robot, or any other vehicle platforms.

The connected vehicle 103 may include computing device(s) 152 having sensor(s) 113, processor(s) 115, memory(ies) 117, communication unit(s) 119, vehicle data store(s) 121, and a function deployment control 120. Examples of the computing device 152 may include virtual or physical computer processors, control units, micro-controllers, etc., which are coupled to other components of the connected vehicle 103, such as one or more sensors 113, actuators, motivators, etc. The connected vehicle 103 may be coupled to the network 105 via signal line 141, and may send and receive data to and from other connected vehicle(s) 103 and/or the server(s) 101.

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the connected vehicle 103, the processor may be an electronic control unit (ECU) implemented in the connected vehicle 103 such as a car, although other types of platform are also possible and contemplated. The ECUs may receive and store the sensor data associated with the connected vehicle 103 and/or the sensor data associated with other connected vehicles 103 in the vehicle data store 121 for access and/or retrieval by the function deployment control 120. In some implementations, the processor(s) 115 may be capable of generating and providing electronic display signals to input/output device(s), supporting the display of images, capturing and transmitting images, performing complex tasks including various types of data computation, traffic estimation, etc. In some implementations, the processor(s) 115 may be coupled to the memory(ies) 117 via a communication bus 154 to access data and instructions therefrom and store data therein. The communication bus 154 may couple the processor(s) 115 to the other components of the connected vehicle 103 including, for example, the sensor(s) 113, the memory(ies) 117, the communication unit(s) 119, and/or the vehicle data store 121.

The function deployment control 120 includes software and/or hardware logic executable to deploy vehicle functions for the connected vehicles 103. As illustrated in FIG. 1, the servers 101*a* . . . 101*n* may include instances 120*a* . . . 120*n*, and the connected vehicle 103*a* . . . 103*n* may include instances 120*b* . . . 120*m* of the function deployment control 120. In some embodiments, each instance 120*a* . . . 120*n* and 120*b* . . . 120*m* may comprise one or more components the function deployment control 120 depicted in FIG. 2, and may be configured to fully or partially perform the functionalities described herein depending on where the instance resides. In some embodiments, the function deployment control 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The function deployment control 120 may receive and process vehicle dynamics, trip data, traffic pattern, etc., and communicate with other elements of the connected vehicle 103 via the communication bus 154, such as the memory 117, the communication unit 119, the vehicle data store 121, etc. The function deployment control 120 is described in details below with reference to at least FIGS. 2-8.

The memory(ies) 117 includes a non-transitory computer-usable (e.g., readable, writeable, etc.) medium, which can be any tangible non-transitory apparatus or device that can contain, store, communicate, propagate, or transport instructions, data, computer programs, software, code, routines, etc., for processing by or in connection with the processor(s) 115. For example, the memory(ies) 117 may store the function deployment control 120. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray', etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wireless transceivers and/or wired interfaces for sending and receiving data. The communication unit 119 may couple to the network 105 and communicate with other entities of the system 100, such as other connected vehicle(s) 103 and/or server(s) 101, etc. The communication unit 119 may exchange data with other computing nodes using standard communication methods, such as those discussed above.

The sensor(s) 113 includes any type of sensors suitable for the connected vehicle(s) 103. The sensor(s) 113 may be configured to collect any type of signal data suitable to determine characteristics of the connected vehicle 103 and/or its internal and external environments. Non-limiting examples of the sensor(s) 113 include various optical sensors (CCD, CMOS, 2D, 3D, light detection and ranging (LIDAR), cameras, etc.), audio sensors, photo sensors, motion detection sensors, barometers, altimeters, thermocouples, moisture sensors, infrared (IR) sensors, radar sensors, gyroscopes, accelerometers, speedometers, steering sensors, braking sensors, switches, vehicle indicator sensors, windshield wiper sensors, geo-location sensors (e.g., GPS (Global Positioning System) sensors), orientation sensor, wireless transceivers (e.g., cellular, WiFi™, near-field, etc.), sonar sensors, ultrasonic sensors, proximity sensors, distance sensors, etc. In some embodiments, the sensors 113 may include externally facing sensors provided at the front side, rear side, right side, and/or left side of the connected vehicle 103 to capture the situational context surrounding the connected vehicle 103. In some embodiments, the sensor(s) 113 may include one or more image sensors (e.g., cameras) configured to capture images (e.g., video images, still images) of the environment proximate to the connected vehicle 103 including surrounding vehicles, roadway structure (e.g., lanes, road markings, traffic light, etc.), roadway objects (e.g., traffic cones, barricades, etc.), etc.

The vehicle data store 121 includes a non-transitory storage medium that stores various types of data. For example, the vehicle data store 121 may store vehicle data being communicated between different components of the connected vehicle 103 using a bus, such as a controller area network (CAN) bus. In some embodiments, the vehicle data may include vehicle operation data collected from the sensors 113 that are coupled to different components of the connected vehicle 103 for monitoring operating states of these components (e.g., wheel speed (Revolutions Per Minute—RPM), steering angle, braking force, etc.). In some embodiments, the vehicle data may also include other sensor data collected from the sensors 113 that monitor the roadway environment proximate to the connected vehicle 103 (e.g., captured images, etc.).

In some embodiments, the vehicle data may include one or more vehicle dynamics describing the vehicle movements of the connected vehicle 103. The vehicle dynamics may be determined from the vehicle operation data and/or other sensor data of the connected vehicle 103. Non-limiting examples of the vehicle dynamics of the connected vehicle 103 include the vehicle speed, the acceleration/deceleration rate, the vehicle location (e.g., GPS coordinates), the lane number, etc., of the connected vehicle 103. In some embodiments, the vehicle data may include multiple sets of vehicle dynamics of the connected vehicle 103, each set of vehicle dynamics may be associated with a timestamp and may describe the vehicle movements of the connected vehicle 103 at the timestamp. In some embodiments, the vehicle data may also include vehicle dynamics describing the vehicle movements of proximate vehicles that are captured by the sensors 113 of the connected vehicle 103. In some embodiments, the connected vehicle 103 may analyze its sensor data that monitors the proximate environment, and determine the vehicle dynamics of the proximate vehicles based on the vehicle dynamics of the connected vehicle 103 and based on the relative position of the proximate vehicles on the road segment, the relative distance between the connected vehicle 103 and the proximate vehicles, etc., as reflected in the sensor data.

In some embodiments, the vehicle data store 121 may store trip data describing the vehicle trip of the connected vehicle 103. The trip data of the connected vehicle 103 may include a departure time, a departure point, a destination point, a vehicle route from the departure point to the destination point, turning points in the vehicle route, etc., of the connected vehicle 103. In some embodiments, the vehicle data store 121 may also store vehicle preference of the connected vehicle 103. The vehicle preference may indicate one or more vehicle functions that are likely requested or executed by the connected vehicle 103 to improve driving experience and/or vehicle operations of the connected vehicle 103. Non-limiting examples of the vehicle function include a function to minimize travel time, a function to increase traffic safety, a function to maximize fuel efficiency, etc. In some embodiments, the vehicle data store 121 may store a vehicle priority metric indicating a level of priority associated with the connected vehicle 103. For example, emergency vehicles (e.g., ambulances, fire trucks, etc.) may have a relatively high vehicle priority metric as compared to other vehicles.

In some embodiments, the vehicle data store 121 may be part of a data storage system (e.g., a standard data or database management system) for storing and providing access to data. Other types of data stored in the vehicle data store 121 are also possible and contemplated.

The server 101 includes a hardware and/or virtual server that includes a processor, a memory, and network communication capabilities (e.g., a communication unit). As depicted, the server 101 may be communicatively coupled to the network 105, as reflected by signal line 145. The server 101 may send and receive data to and from other entities of the system 100 (e.g., connected vehicles 103, other servers 101, etc.). In some embodiments, the server 101 may be a central server located remotely from a roadway area. For example, the server 101 may be a cloud server residing in a data center. In some embodiments, the server 101 may be a local server located proximate to the roadway area. For example, the server 101 may be a roadside unit or an edge server located within a predefined distance from the roadway area. The roadway area may include one or more road segments on which the vehicles travel.

In some embodiments, the server 101 may be associated with a geographic region in the roadway area, and the server 101 may provide or facilitate the execution of various vehicle functions for the connected vehicles 103 located within the geographic region. For example, the server 101 may execute the vehicle functions, and transmit execution results of the vehicle functions (e.g., optimal vehicle route, target vehicle speed, etc.) to the connected vehicles 103 located within the geographic region. Alternatively, the server 101 may compute function data for the vehicle functions, and transmit the function data to the connected vehicles 103 located within the geographic region so that the connected vehicles 103 may execute the vehicle functions using the function data. As depicted, the servers 101 may include an instance of the function deployment control 120 and a server data store 125 that stores various types of data for access and/or retrieval by the function deployment control 120.

The server data store 125 includes a non-transitory storage medium that stores various types of data. For example, the server data store 125 may store a server identifier (ID) uniquely identify the server 101, region data describing the geographic region associated with the server 101 (e.g., region location (e.g., GPS coordinates), shape and size, etc.), etc. In some embodiments, the server data store 125 may also store the vehicle dynamics of various vehicles associated with the geographic region at multiple timestamps. The vehicles associated with the geographic region may include one or more connected vehicles 103 and/or one or more unconnected vehicles 123 that are located within the geographic region or within a predefined distance from the geographic region (e.g., 1500 m). As discussed elsewhere herein, for each vehicle at each timestamp, the vehicle dynamics may include vehicle location, vehicle speed, acceleration/deceleration rate, lane number, etc., of the vehicle at the timestamp. In some embodiments, for each connected vehicle 103 associated with the geographic region, the server data store 125 may also store the trip data, the vehicle priority metric, the vehicle preference, etc., of the connected vehicle 103.

In some embodiments, the server data store 125 may store the traffic conditions of various road segments associated with the geographic region at multiple timestamps. The road segments associated with the geographic region may include one or more road segments located within the geographic region or located within a predefined distance from the geographic region (e.g., 1500 m). For each road segment at each timestamp, the traffic condition may include the average roadway speed indicating the average speed of the vehicles travelling on the road segment at the timestamp (e.g., 100 km/h), one or more average lane speeds indicating the average speed of the vehicles travelling in each lane of the road segment at the timestamp (e.g., 120 km/h, 95 km/h, etc.), the vehicle density indicating the number of vehicles present on a predefined distance of the road segment at the timestamp (e.g., 40 vehicles/km), the traffic flow rate indicating the number of vehicles passing a static point of observation on the road segment during a predefined time period at the timestamp (e.g., 4000 vehicles/h), the average travel time indicating an average amount of time to travel from the start point to the end point of the road segment at the timestamp, etc. In some embodiments, for each road segment associated with the geographic region, the server data store 125 may also store a roadway infrastructure describing various roadway components in the road segment that may impact the flow of traffic (e.g., lanes, traffic lights, freeway ramps, etc.). For example, the roadway infrastructure may indicate a number of lanes in the road segment, a traffic signal location, a traffic signal duration, etc., of traffic lights at one or more intersections in the road segment, a ramp location, a ramp length, a merging angle, etc., of one or more freeway ramps in the road segment, etc.

In some embodiments, the server data store 125 may store a connected vehicle status of the geographic region. In some embodiments, the connected vehicle status of the geographic region may be associated with a future point in time and may describe the connected vehicles 103 that will be in the geographic region at the future point in time. In some embodiments, the connected vehicle status may include an estimated number of connected vehicles 103 that will be in the geographic region at the future point in time. For each connected vehicle 103 that will be in the geographic region at the future point in time, the connected vehicle status may include an estimated enter time, an estimated exit time, an estimated serving duration of the connected vehicle 103 in the geographic region. The connected vehicle status may also include a travel path of the connected vehicle 103 in the geographic region, and estimated vehicle dynamics of the connected vehicle 103 in the geographic region as the connected vehicle 103 proceeds through the geographic region during a future time period (e.g., predicted vehicle speed, predicted vehicle location, etc., of the connected vehicle 103 at multiple timestamps within the future time period).

In some embodiments, the server data store 125 may be part of a data storage system (e.g., a standard data or database management system) for storing and providing access to data. Other types of data stored in the server data store 125 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For example, various functionalities and/or acts may be moved from a server to a client, or vice versa, data may be consolidated into a single data store or further segmented into additional data stores, and some implementations may include additional or fewer computing devices, services, and/or networks, and may implement various client or server-side functionalities. Furthermore, various entities of the system may be integrated into a single computing device or system or divided into additional computing devices or systems, etc.

Figure 2:
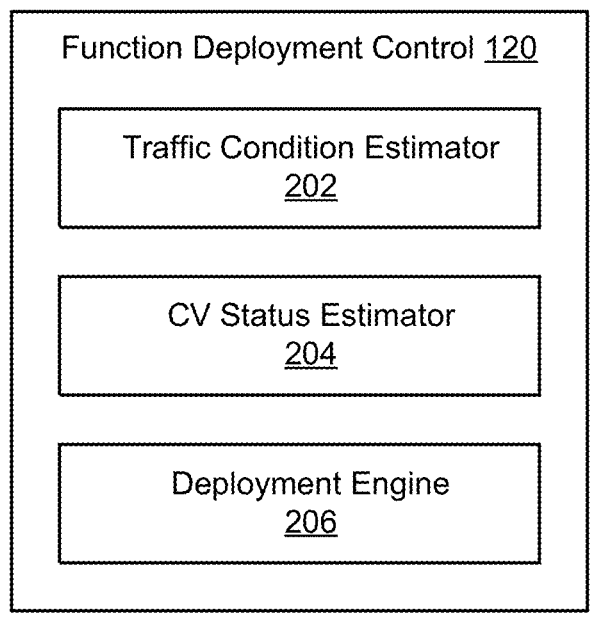
FIG. 2 is a block diagram of an example function deployment control.

FIG. 2 is a block diagram of an example function deployment control 120. As depicted, the function deployment control 120 may include a traffic condition estimator 202, a connected vehicle (CV) status estimator 204, and a deployment engine 206, although it should be understood that the function deployment control 120 may include additional components such as, but not limited to, a configuration engine, an encryption/decryption engine, etc., and/or these various components may be combined into a single engine or divided into additional engines. The traffic condition estimator 202, the CV status estimator 204, and the deployment engine 206, may be implemented as software, hardware, or a combination of the foregoing. In some embodiments, the traffic condition estimator 202, the CV status estimator 204, and the deployment engine 206 may be communicatively coupled by the communication bus 154 and/or the processor 115 to one another and/or to other components of the computing device 152. In some embodiments, one or more of 120, 202, 204, and/or 206 are sets of instructions executable by the processor 115 to provide their functionality. In further embodiments, one or more of 120, 202, 204, and/or 206 are storable in the memory 117 and are accessible and executable by the processor 115 to provide their functionality. In any of the foregoing embodiments, 120, 202, 204, and/or 206 may be adapted for cooperation and communication with the processor 115 and other components of the computing device 152. The function deployment control 120, and its components 202, 204, and 206 are described in further detail below with reference to at least FIGS. 3-8.

Figure 3:
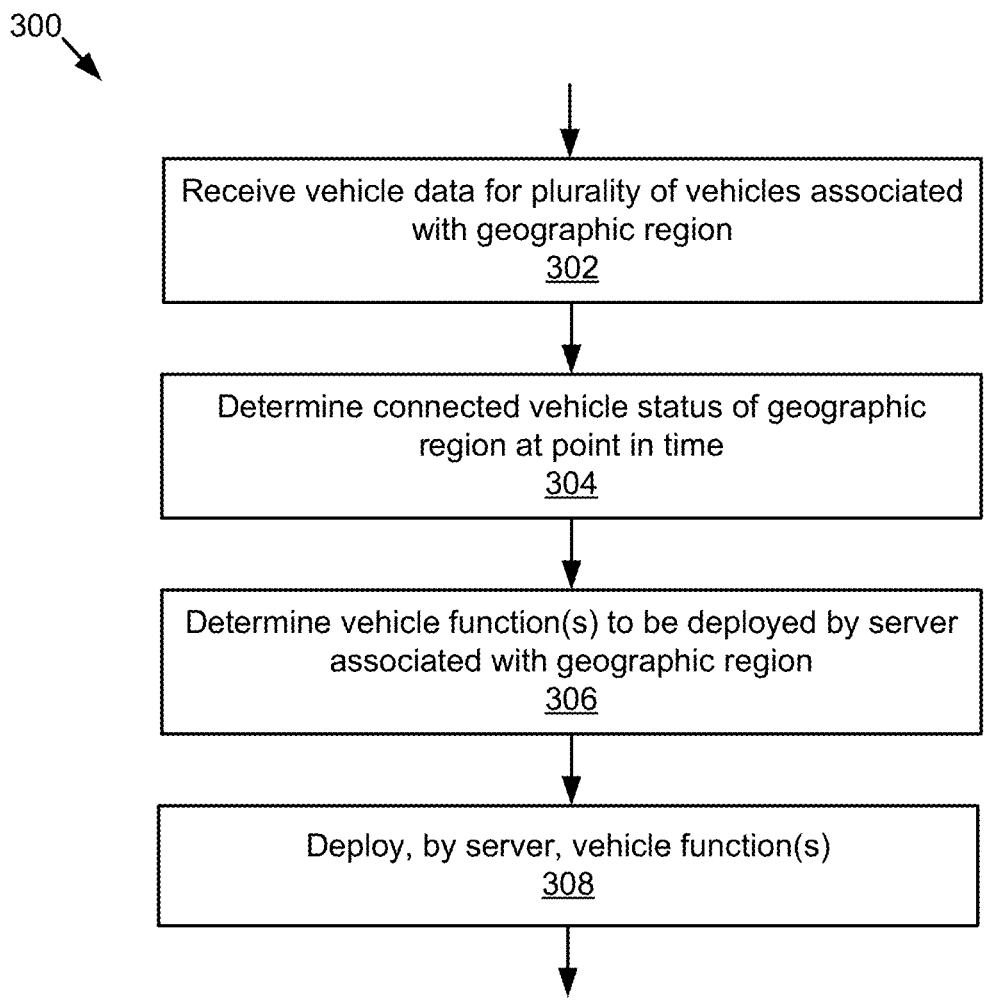
FIG. 3 is a flowchart of an example method for deploying vehicle functions for connected vehicles.
Figure 7A:
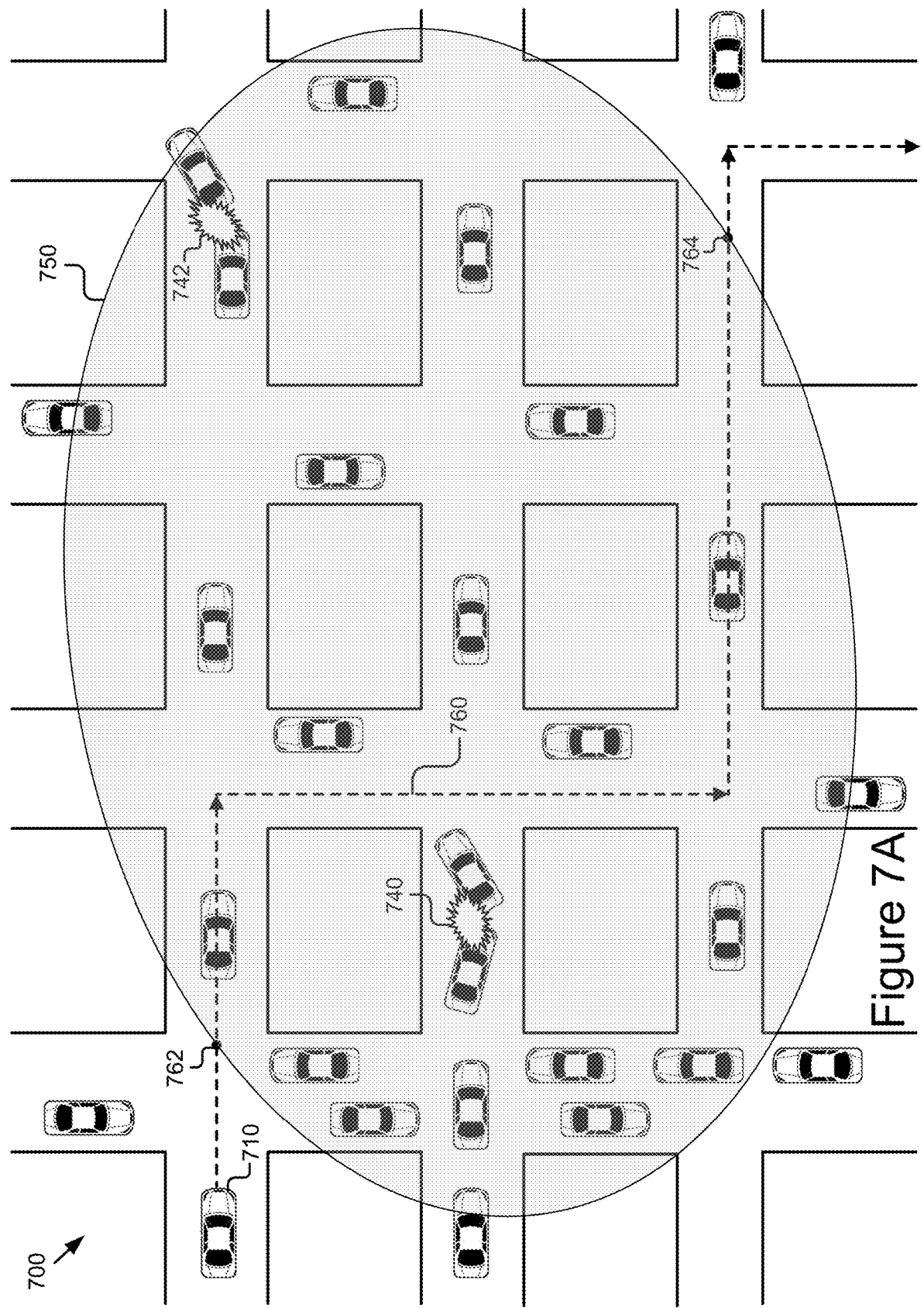
FIG. 7A illustrates an example geographic region of a server in a roadway area.

FIG. 3 is a flowchart of an example method 300 for deploying vehicle functions for connected vehicles 103. In block 302, the traffic condition estimator 202 may receive vehicle data for a plurality of vehicles associated with a geographic region in a roadway area. The geographic region may be associated with a server 101, and the server 101 may provide or facilitate the execution of various vehicle functions for the connected vehicles 103 located within the geographic region. As discussed elsewhere herein, the plurality of vehicles associated with the geographic region may include one or more connected vehicles 103 and/or one or more unconnected vehicles 123 associated with the geographic region. The connected vehicles 103 and the unconnected vehicles 123 associated with the geographic region may be located within the geographic region or within a predefined distance from the geographic region (e.g., 1500 m). FIG. 7A illustrates an example geographic region 750 of a server 101 in a roadway area 700. As depicted, the roadway area 700 may include the plurality of vehicles traveling on various road segments that are located within or proximate to the geographic region 750 of the server 101.

In some embodiments, the traffic condition estimator 202 may receive the vehicle data for the plurality of vehicles associated with the geographic region from one or more connected vehicles 103 associated with the geographic region. In some embodiments, the vehicle data received from a connected vehicle 103 may include the vehicle operation data and/or other sensor data of the connected vehicle 103 that describe the vehicle movements of the connected vehicle 103 and the proximate vehicles of the connected vehicle 103 at a particular timestamp. The proximate vehicles of the connected vehicle 103 may be captured by the sensors of the connected vehicle 103, and thus the sensor data of the connected vehicle 103 may describe the vehicle movements of these proximate vehicles. In some embodiments, the traffic condition estimator 202 may analyze the vehicle data received from the connected vehicle 103, and determine the vehicle dynamics of the connected vehicle 103 and its proximate vehicles at the corresponding timestamp. As discussed elsewhere herein, for each vehicle at each timestamp, the vehicle dynamics of the vehicle may include the vehicle location, the vehicle speed, the acceleration/deceleration rate, the lane number, etc., of the vehicle at the timestamp. Thus, the traffic condition estimator 202 may obtain the vehicle dynamics of not only the connected vehicles 103 but also the unconnected vehicles 123 associated with the geographic region.

Figure 5:
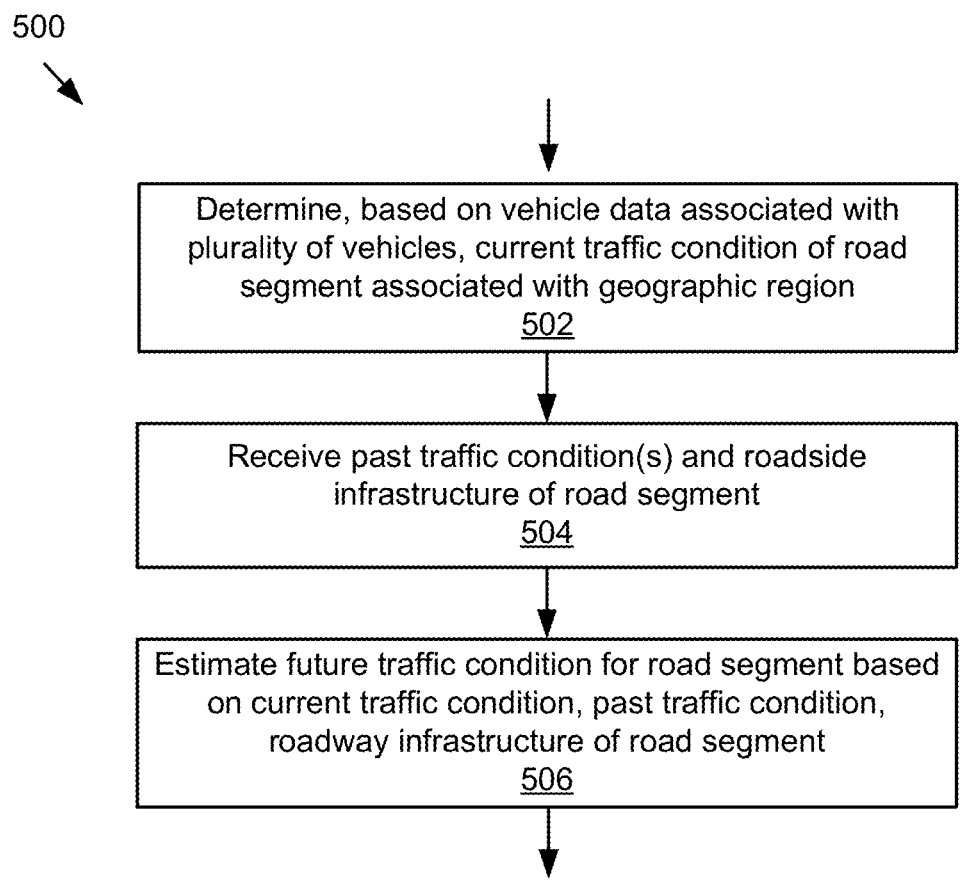
FIG. 5 is a flowchart of an example method for estimating a future traffic condition for a road segment.

In some embodiments, the traffic condition estimator 202 may estimate a future traffic condition for each road segment associated with the geographic region at a future point in time indicated by a future timestamp. The road segments associated with the geographic region may include one or more road segments located within the geographic region or located within a predefined distance from the geographic region (e.g., 1500 m). FIG. 5 illustrates an example method 500 for estimating the future traffic condition of a road segment associated with the geographic region at the future point in time. In block 502, the traffic condition estimator 202 may determine a current traffic condition of the road segment at a current timestamp based on the vehicle data for the plurality of vehicles. In some embodiments, the traffic condition estimator 202 may determine the vehicle dynamics of the plurality of vehicles associated with the geographic region from the vehicle data as discussed above. To determine the current traffic condition of the road segment, the traffic condition estimator 202 may determine one or more vehicles located on the road segment at the current timestamp based on their vehicle location, and analyze the vehicle dynamics of these vehicles to determine the average roadway speed, the average lane speeds in one or more lanes, the vehicle density, the traffic flow rate, the average travel time, etc., associated with the road segment at the current timestamp. Thus, the current traffic condition of the road segment may describe the real-time traffic on the road segment at the current timestamp.

In block 504, the traffic condition estimator 202 may receive one or more past traffic conditions of the road segment and the roadway infrastructure of the road segment from the server data store 125. In some embodiments, a past traffic condition may describe the past traffic on the road segment at a past timestamp and may include the average roadway speed, the average lane speeds in one or more lanes, the vehicle density, the traffic flow rate, the average travel time, etc., associated with the road segment at the past timestamp. In some embodiments, the roadway infrastructure may describe various roadway components of the road segment that may impact the flow of the traffic (e.g., lanes, traffic lights, freeway ramps, etc.). For example, the traffic flow rate often decreases near the freeway ramps because the vehicles usually slow down to adjust to other vehicles changing lane to enter or exit the freeway.

In block 506, the traffic condition estimator 202 may estimate the future traffic condition for the road segment at the future point in time based on the current traffic condition, the past traffic conditions, and the roadway infrastructure of the road segment. In some embodiments, the traffic condition estimator 202 may determine a traffic pattern of the road segment based on the past traffic conditions of the road segment at one or more past timestamps. To estimate the future traffic condition of the road segment at the future point in time, the traffic condition estimator 202 may then apply a machine learning model to the current traffic condition, the traffic pattern, and the roadway infrastructure of the road segment. The machine learning model may match the current traffic condition of the road segment to the traffic pattern of the road segment given the roadway infrastructure of the road segment, and predictively estimate the future traffic condition including the average roadway speed, the average lane speeds in one or more lanes, the vehicle density, the traffic flow rate, the average travel time, etc., associated with the road segment at the future timestamp (e.g., 3 minutes from the current timestamp). Thus, the future traffic condition may describe the short-term future traffic at the future point in time predicted for the road segment. In some embodiments, the traffic condition estimator 202 may estimate the future traffic condition for the road segment at multiple future timestamps (e.g., 3 minutes from the current timestamp, 6 minutes from the current timestamp, etc.).

In some embodiments, in addition to estimating the future traffic condition of various road segments associated with the geographic region, the traffic condition estimator 202 may also generate a traffic model for the geographic region based on the traffic conditions of these road segments at the same timestamp. The traffic model of the geographic region may describe the overall traffic pattern in various road segments associated with the geographic region. As discussed elsewhere herein, the road segments associated with the geographic region may be located within the geographic region or within the predefined distance from the geographic region.

Referring back to FIG. 3, in block 304, the CV status estimator 204 may determine a connected vehicle status of the geographic region at a point in time using the vehicle data for the plurality of vehicles associated with the geographic region. In some embodiments, the point in time may be the future point in time (e.g., 3 minutes subsequent to the current timestamp), and the connected vehicle status of the geographic region may describe one or more connected vehicles 103 that will be in the geographic region at the future point in time. In some embodiments, the connected vehicle status of the geographic region may also reflect the estimated number of connected vehicles 103 in the geographic region at the future point in time.

Figure 4:
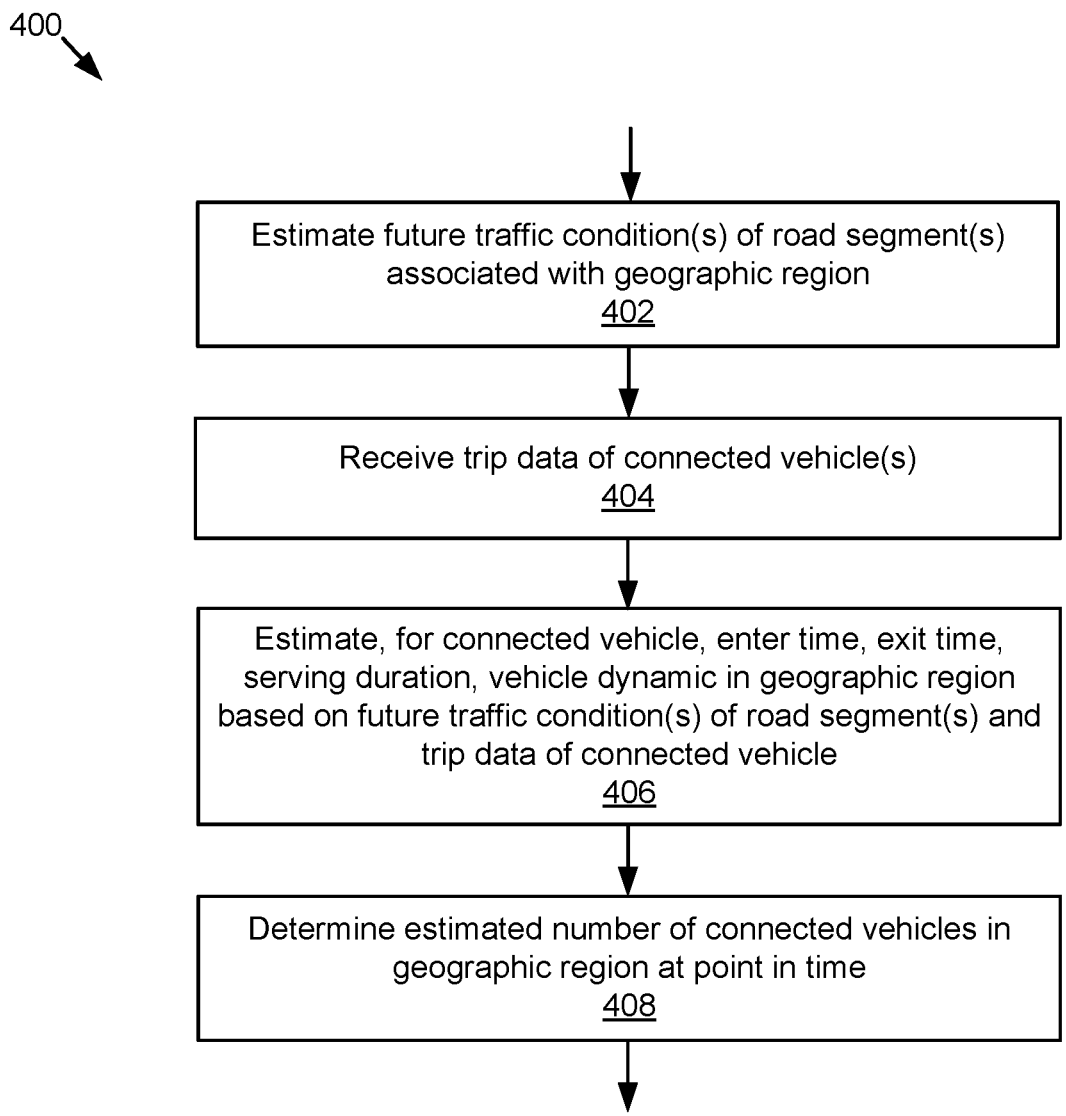
FIG. 4 is a flowchart of an example method for determining a connected vehicle status of a geographic region associated with a server.

FIG. 4 is a flowchart of example method 400 for predictively determining the connected vehicle status of the geographic region. In block 402, the traffic condition estimator 202 may estimate one or more future traffic conditions of one or more road segments associated with the geographic region at one or more future points in time. In some embodiments, the future traffic condition of these road segments may be estimated based on the current traffic conditions determined from the vehicle data of the plurality of vehicles associated with the geographic region, the traffic pattern determined from the past traffic conditions of various road segments associated with the geographic region, the roadway infrastructure of various road segments associated with the geographic region, etc., as discussed in details with reference to method 500 in FIG. 5. As discussed above with reference to FIG. 5, the future traffic condition of each road segment at the future point in time may describe the future traffic at the future point in time predicted for the road segment and may include the average roadway speed, the average lane speeds in one or more lanes, the vehicle density, the traffic flow rate, etc., associated with the road segment at the future point in time.

In block 404, the CV status estimator 204 may receive the trip data of the connected vehicles 103 associated with the geographic region. As discussed elsewhere herein, the connected vehicles 103 associated with the geographic region may include one or more connected vehicles 103 that are located within the geographic region or within a predefined distance from the geographic region (e.g., 1500 m). In some embodiments, the CV status estimator 204 may receive the trip data of the connected vehicles 103 from the connected vehicles 103. For each connected vehicle 103, the trip data may include the departure time, the departure point, the destination point, the vehicle route from the departure point to the destination point, the turning points in the vehicle route, etc., of the connected vehicle 103.

In block 406, for a connected vehicle 103 associated with the geographic region, the CV status estimator 204 may predictively estimate an enter time, an exit time, a serving duration, and one or more vehicle dynamics of the connected vehicle 103 in the geographic region based on one or more future traffic conditions of various road segments associated with the geographic region and the trip data of the connected vehicle 103. In some embodiments, the CV status estimator 204 may match the vehicle route of the connected vehicle 103 to the geographic region, and determine whether the connected vehicle 103 will proceed through the geographic region as the connected vehicle 103 follows its vehicle route. If the connected vehicle 103 will proceed through the geographic region, the CV status estimator 204 may determine the matching portion between the vehicle route of the connected vehicle 103 and the geographic region to be the travel path of the connected vehicle 103 along which the connected vehicle 103 will proceed through the geographic region. The CV status estimator 204 may determine the start point of the travel path at which the connected vehicle 103 may enter the geographic region to be the enter point of the connected vehicle 103 associated with the geographic region, and determine the end point of the travel path at which the connected vehicle 103 may leave the geographic region to be the exit point of the connected vehicle 103 associated with the geographic region.

In some embodiments, for each connected vehicle 103 that will proceed through the geographic region, the CV status estimator 204 may estimate the enter time and the exit time at which the connected vehicle 103 may enter and exit the geographic region based on one or more future traffic conditions of various road segments associated with the geographic region and the trip data of the connected vehicle 103. For example, the CV status estimator 204 may apply the average travel time being estimated for various road segments associated with the geographic region at one or more future timestamps, the vehicle route of the connected vehicle 103, the departure time of the connected vehicle 103, etc., to the traffic model of the geographic region, and predictively estimate the enter time $t_{enter}$ at which the connected vehicle 103 may arrive at the enter point to enter the geographic region, and the exit time $t_{exit}$ at which the connected vehicle 103 may arrive at the exit point to leave the geographic region. In some embodiments, the CV status estimator 204 may determine the serving duration in which the connected vehicle 103 may be located within the geographic region, and thus the server 101 associated with the geographic region may provide or facilitate the execution of the vehicle functions for the connected vehicle 103. In some embodiments, the CV status estimator 204 may determine the time window between the enter time $t_{enter}$ and the exit time $t_{exit}$ of the connected vehicle 103 during which the connected vehicle 103 may proceed through the geographic region along the travel path to be the serving duration of the connected vehicle 103 in the geographic region.

Continuing the example in FIG. 7A, the CV status estimator 204 may match the vehicle route of the connected vehicle 710 to the geographic region 750 of the server 101, and determine the travel path 760 along which the connected vehicle 710 will proceed through the geographic region 750. As depicted, the travel path 760 may start at the enter point 762 at which the connected vehicle 710 may enter the geographic region 750, and end at the exit point 764 at which the connected vehicle 710 may leave the geographic region 750. In this example, the CV status estimator 204 may apply the average travel time being estimated for various road segments located within and/or proximate to the geographic region 750 at one or more future timestamps, the current vehicle location of the connected vehicle 710, the vehicle route of the connected vehicle 710, etc., to the traffic model of the geographic region 750, and predictively estimate that the connected vehicle 710 may arrive at the enter point 762 and enter the geographic region 750 at the enter time $t_{enter}$=14:00:00, and that the connected vehicle 710 may arrive at the exit point 764 and exit the geographic region 750 at the exit time $t_{exit}$=14:03:00. In this example, the CV status estimator 204 may determine the serving duration in which the server 101 may provide or facilitate the execution of vehicle functions for the connected vehicle 710 to be the time window between the enter time $t_{enter}$=14:00:00 and the exit time $t_{exit}$=14:03:00 during which connected vehicle 710 is predicted to be traveling along the travel path 760 within the geographic region 750 of the server 101.

In some embodiments, the CV status estimator 204 may estimate the vehicle dynamics of the connected vehicle 103 in the geographic region based on one or more future traffic conditions of various road segments associated with the geographic region and the trip data of the connected vehicle 103. In some embodiments, the CV status estimator 204 may apply the average roadway speed, the average lane speeds in one or more lanes, the vehicle density, the traffic flow rate, the average travel time, etc., at one or more future timestamps being estimated for various road segments, and the vehicle route, the current vehicle location, etc., of the connected vehicle 103 to the traffic model of the geographic region, and predictively estimate the vehicle dynamics of the connected vehicle 103 in the geographic region. The vehicle dynamics of the connected vehicle 103 being estimated may include the vehicle location, the vehicle speed, etc., of the connected vehicle 103 in the geographic region at various timestamps (e.g., every 10 s) between the enter time $t_{enter}$ and the exit time $t_{exit}$ during which the connected vehicle 103 is predicted to be within the geographic region. In some embodiments, the vehicle dynamics of the connected vehicle 103 may also include the travel path along which the connected vehicle 103 will proceed through the geographic region as discussed above. Other types of vehicle dynamics being estimated for the connected vehicle 103 are also possible and contemplated.

In block 408, the CV status estimator 204 may determine an estimated number of the connected vehicles 103 in the geographic region at the point in time. To estimate the number of the connected vehicles 103 that will be in the geographic region at the future point in time, for each connected vehicle 103 that will be traveling through the geographic region, the CV status estimator 204 may determine whether the future point in time is within the time window between the enter time $t_{enter}$ and the exit time $t_{exit}$ of the connected vehicle 103 associated with the geographic region. If the future point in time is within the time window between the enter time $t_{enter}$ and the exit time $t_{exit}$ of the connected vehicle 103 associated with the geographic region, the CV status estimator 204 may determine that the connected vehicle 103 will be located within the geographic region at the future point in time. In some embodiments, the CV status estimator 204 may determine the total number of connected vehicles 103 that will be located within the geographic region at the future point in time to be the estimated number of connected vehicles 103 in the geographic region at the future point in time.

Thus, as discussed above, to determine the connected vehicle status of the geographic region at the future point in time, the CV status estimator 204 may determine the estimated number of connected vehicles 103 located within the geographic region at the future point in time. For each connected vehicle 103 that will be in the geographic region at the future point in time, the CV status estimator 204 may predictively estimate the enter time and the exit time at which the connected vehicle 103 may enter and exit the geographic region, the travel path along which the connected vehicle 103 may proceed through the geographic region, the serving duration between the enter time and the exit time during which the connected vehicle 103 may be located within the geographic region. The CV status estimator 204 may also predictively estimate the vehicle location, the vehicle speed, and/or other vehicle dynamics of the connected vehicle 103 at various timestamps in the serving duration during which the connected vehicle 103 may be located within the geographic region.

Thus, the connected vehicle status of the geographic region may describe the connected vehicles 103 that are predicted to be within the geographic region at the future point in time, given the future traffic conditions of various road segments associated with the geographic region that are estimated from the current traffic condition of these road segments. As a result, the server 101 associated with the geographic region may deploy the vehicle functions for these connected vehicles 103 beforehand so that the function data of the vehicle functions is ready for their execution when these connected vehicles 103 are within the geographic region. This implementation is advantageous, because the server 101 can flexibly adapt the deployment of the vehicle functions to the traffic condition of the road segments associated with the geographic region, and such deployment can significantly reduce the computational latency of the server 101 in providing or facilitating the execution of the vehicle functions for the connected vehicles 103.

Referring back to FIG. 3, in block 306, the deployment engine 206 may determine one or more vehicle functions to be deployed by the server 101 associated with the geographic region based on the connected vehicle status of the geographic region. For example, the deployment engine 206 may determine the vehicle functions to be deployed by the server 101 based on the estimated number of connected vehicles 103 in the geographic region at the future point in time. In block 308, the deployment engine 206 may deploy the vehicle functions using available resources of the server 101.

Figure 6:
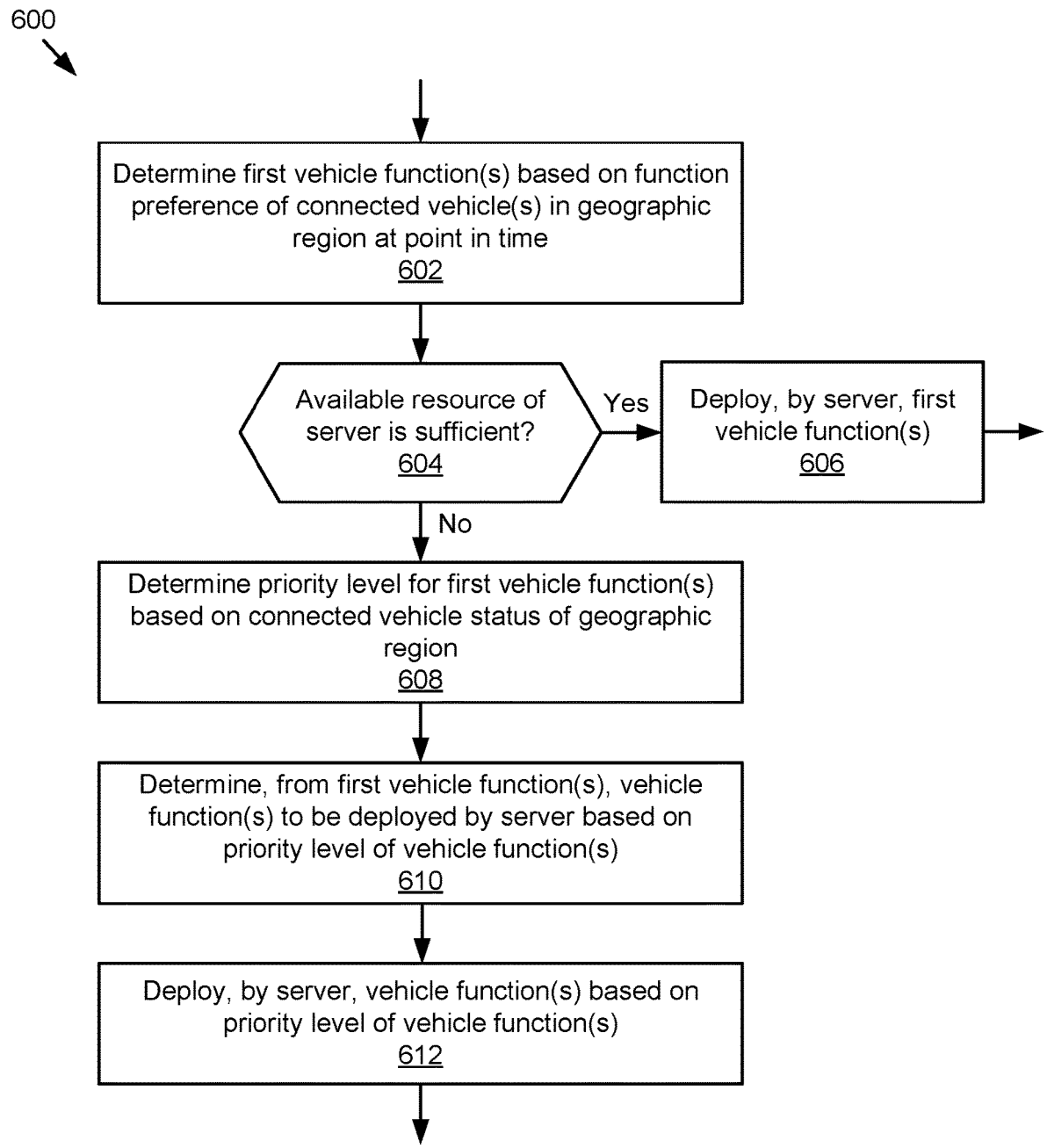
FIG. 6 is a flowchart of an example method for determining and deploying vehicle functions.

FIG. 6 is a flowchart of an example method 600 for determining and deploying vehicle functions. In block 602, the deployment engine 206 may determine one or more first vehicle functions for one or more connected vehicles 103 in the geographic region of the server 101 at the point in time. In some embodiments, the deployment engine 206 may determine one or more connected vehicles 103 that will be in the geographic region of the server 101 at the future point in time based on the connected vehicle status of the geographic region. For each connected vehicle 103 that will be in the geographic region at the future point in time, the deployment engine 206 may receive the vehicle preference of the connected vehicle 103 from the server data store 125, and determine one or more first vehicle functions included in the vehicle preference of the connected vehicle 103. The connected vehicle 103 may likely request the execution of the first vehicle function(s) and/or request the function data of the first vehicle function(s) when the connected vehicle 103 is in the geographic region, and these first vehicle function(s) may be referred to as the vehicle function(s) associated with the connected vehicle 103. Non-limiting examples of the vehicle function include the function to minimize travel time, the function to increase traffic safety, the function to maximize fuel efficiency, etc.

In block 604, the deployment engine 206 may determine whether the available resources of the server 101 are sufficient enough to deploy all first vehicle functions associated with the connected vehicles 103 for the connected vehicles 103 that will be in the geographic region at the future point in time. In some embodiments, the deployment engine 206 may evaluate the available computing resources of a computing system, such as a server, for a particular current or future timeframe. The timeframe may be a particular point in time or a time range. The computing resources may comprise available memory, available central processing unit capacity, available network bandwidth, network latency, etc.

For example, the deployment engine 206 may estimate the amount of computing resource required to deploy the first vehicle functions for the connected vehicles 103, and compare the amount of resource required to deploy the first vehicle functions for the connected vehicles 103 to the amount of available resources of the server 101 (e.g., the capacity of free memory space, the percentage of available processing capacity, the unoccupied network bandwidth, etc.). If the amount of resource required to deploy the first vehicle functions for the connected vehicles 103 is less than or equal to the amount of available resources of the server 101, the deployment engine 206 may determine that the available resources of the server 101 are sufficient to deploy all first vehicle functions associated with the connected vehicles 103 for the connected vehicles 103 that will be in the geographic region at the future point in time. The method 600 may then proceed to block 606. In block 606, the deployment engine 206 may deploy the first vehicle functions for the connected vehicles 103. In some embodiments, the deployment engine 206 may deploy all first vehicle functions associated with the connected vehicles 103 for the connected vehicles 103 that will be in the geographic region at the future point in time using the available resources of the server 101.

In some embodiments, to deploy a first vehicle function from the first vehicle functions for a first connected vehicle 103 from the connected vehicles 103 that will be in the geographic region at the point in time (e.g., the future point in time), the deployment engine 206 may preliminarily compute the function data including one or more operating parameters for the first vehicle function prior to the future point in time. Thus, the operating parameters of the first vehicle function may be available for the server 101 and/or the first connected vehicle 103 to execute the first vehicle function when the first connected vehicle 103 is located within the geographic region at the future point in time. In some embodiments, the operating parameters of the first vehicle function may include various data values, metrics, parameters, etc. that are used to execute the first vehicle function. In some embodiments, the deployment engine 206 may compute the operating parameters corresponding to multiple timestamps for the first vehicle function.

As an example, the first vehicle function associated with the first connected vehicle 103 may be the function to minimize travel time. In this example, the deployment engine 206 may analyze the vehicle dynamics of one or more vehicles located within the geographic region, and compute the operating parameters for the first vehicle function including the average roadway speed of the road segments associated with the geographic region (e.g., 25 mph in the first road segment, 40 mph in the second road segment, etc.), the average lane speed in each lane of the road segments (e.g., 30 mph in left-most lane, 24 mph in middle lane, etc.), the traffic signal duration associated with the intersections in the geographic region (e.g., 30 s at the first intersection, 20 s at the second intersection, etc.), etc. These operating parameters of the first vehicle function may be used to execute the first vehicle function that determines the optimal road segments and/or the optimal lane in the road segments for the first connected vehicle 103 to proceed through the geographic region with minimal travel time.

As another example, the first vehicle function associated with the first connected vehicle 103 may be the function to increase traffic safety. In this example, the deployment engine 206 may compute the operating parameters for the first vehicle function including the driving pattern and/or the driving score of one or more vehicles (e.g., connected vehicles 103 and/or unconnected vehicles 123) located on the road segments within the geographic region, the situation location and the impact zone of the traffic situations in the geographic region (e.g., traffic accidents, road constructions, etc.), etc. These operating parameters of the first vehicle function may be used to execute the first vehicle function that determines the optimal road segments for the first connected vehicle 103 to safely proceed through the geographic region.

In some embodiments, the deployment engine 206 may compute the function data for the first vehicle function associated with the first connected vehicle 103 based on the estimated vehicle dynamics of the first connected vehicle 103 in the geographic region. These estimated vehicle dynamics may be the vehicle dynamics that the first connected vehicle 103 is predicted to have when the first connected vehicle 103 is in the geographic region and may include the estimated vehicle location, the estimated vehicle speed, etc., of the first connected vehicle 103 at one or more timestamps in the serving duration of the first connected vehicle 103. In some embodiments, the deployment engine 206 may analyze the estimated vehicle dynamics of the first connected vehicle 103 to generate the function data that is relevant to the execution of the first vehicle function for the first connected vehicle 103.

Continuing the example in FIG. 7A, the roadway area 700 may include two traffic accidents 740 and 742 as depicted in FIG. 7A, and the first vehicle function associated with the connected vehicle 710 may be the function to increase traffic safety. The deployment engine 206 may analyze the estimated vehicle locations of the connected vehicle 710 in the geographic region 750 at multiple timestamps in the serving duration of the connected vehicle 710, and determine that the traffic accident 740 is located within a predefined distance from one or more estimated vehicle locations of the connected vehicle 710 in the geographic region 750 (e.g., less than 2000 m) while the traffic accident 742 is not. In this example, the deployment engine 206 may compute the function data for the first vehicle function associated with the connected vehicle 710, in which the function data may include the situation location and the impact zone of the traffic accident 740 and exclude the situation data of the traffic accident 742. Because the traffic accident 742 is located far away from the travel path of the connected vehicle 710 in the geographic region 750, the situation data of the traffic accident 742 may not be needed to execute the first vehicle function for the connected vehicle 710 that determines the optimal road segments for the connected vehicle 710 to safely proceed through the geographic region 750.

In this example, the deployment engine 206 may also analyze the estimated vehicle locations of the connected vehicle 710 in the geographic region 750 at one or more timestamps in the serving duration of the connected vehicle 710, and determine the proximate road segments in the geographic region 750 that are located within a predefined distance from the estimated vehicle locations of the connected vehicle 710 in the geographic region 750 (e.g., less than 1200 m). To compute the function data for the first vehicle function associated with the connected vehicle 710, the deployment engine 206 may determine the driving pattern and/or the driving score of the vehicles located on these proximate road segments. Because the driving behaviors of the vehicles traveling together with the connected vehicle 710 on the same road segment may impact the safety and the driving experience of the connected vehicle 710, the driving pattern and/or the driving score of the vehicles located on the road segments proximate to the estimated vehicle location of the connected vehicle 710 may be needed to execute the first vehicle function for the connected vehicle 710 that determines the optimal road segments for the connected vehicle 710 to safely proceed through the geographic region 750.

In some embodiments, the function data including the operating parameters for the first vehicle function may be updated at a predefined interval (e.g., every 2 s, 5 s, etc.). This implementation is advantageous, because executing the first vehicle function using the updated function data can significantly increase the accuracy of the first vehicle function, thereby effectively improving the driving experience and/or the vehicle operations of the connected vehicle 103. As an example, for the first vehicle function that is the function to minimize travel time, the deployment engine 206 may re-compute the average roadway speed of the road segments associated with the geographic region and the average lane speed in each lane of the road segments at a predefined interval of 3s. In another example, for the first vehicle function that is the function to increase traffic safety, the deployment engine 206 may compute the driving pattern and/or the driving score of the vehicles located on each road segment in the geographic region at a predefined interval of 2s. In some embodiments, as various vehicles may enter and/or leave the road segment over time, the deployment engine 206 may only compute the driving pattern and/or the driving score for the vehicles that were not located on the road segment previously and therefore their driving pattern and/or driving score was not computed in the previous intervals. This implementation is advantageous, because it limits the amount of computation needed to update the function data for the first vehicle function.

As discussed elsewhere herein, the deployment engine 206 may deploy the first vehicle function associated with the first connected vehicle 103 prior to the future point in time at which the first connected vehicle 103 will be located within the geographic region. For example, the deployment engine 206 may compute the function data for the first vehicle function that are used in executing the first vehicle function for the first connected vehicle 103 before the first connected vehicle 103 enters the geographic region. The deployment engine 206 may also frequently update the function data of the first vehicle function as discussed above. In some embodiments, the traffic condition estimator 202 may determine that the first connected vehicle 103 is now within the geographic region based on the vehicle location of the first connected vehicle 103. Responsive to determining that the first connected vehicle 103 is within the geographic region, the deployment engine 206 may automatically transmit the function data including the operating parameters associated with the first vehicle function to the first connected vehicle 103, and the first connected vehicle 103 may execute the first vehicle function based on the operating parameters associated with the first vehicle function. For example, the first connected vehicle 103 may receive the average roadway speed of the road segments associated with the geographic region, the average lane speed in each lane of the road segments, the traffic signal duration associated with the intersections in the geographic region, etc., and execute the function to minimize travel time to determine the optimal road segments and/or the optimal lane in the road segments for the first connected vehicle 103 to proceed through the geographic region with minimal travel time.

Alternatively, responsive to determining that the first connected vehicle 103 is within the geographic region, the server 101 may automatically execute the first vehicle function using the function data of the first vehicle function, and transmit the execution result to the first connected vehicle 103. For example, the server 101 may determine the optimal road segments and/or the optimal lane in the road segments for the first connected vehicle 103 to proceed through the geographic region with minimal travel time based on the average roadway speed of the road segments associated with the geographic region, the average lane speed in each lane of the road segments, the traffic signal duration associated with the intersections in the geographic region, etc., and transmit the optimal road segments and/or the optimal lane to the first connected vehicle 103.

In some embodiments, the first connected vehicle 103 may request the function data associated with the first vehicle function from the server 101 when the first connected vehicle 103 is located within the geographic region. Responsive to receiving the request for the function data of the first vehicle function, the deployment engine 206 may transmit the function data associated with the first vehicle function to the first connected vehicle 103, and the first connected vehicle 103 may execute the first vehicle function using the function data of the first vehicle function as discussed above. Alternatively, the first connected vehicle 103 may request the execution of the first vehicle function when the first connected vehicle 103 is located within the geographic region. Responsive to receiving the request for the execution of the first vehicle function, the server 101 may execute the first vehicle function using the function data of the first vehicle function, and transmit the execution result to the first connected vehicle 103 as discussed above. Because the function data of the first vehicle function is computed in advance due to the early deployment of the first vehicle function, the operating parameters associated with the first vehicle function may be promptly available for the server 101 and/or the first connected vehicle 103 to execute the first vehicle function for the first connected vehicle 103 when the first connected vehicle 103 enters the geographic region or when the first connected vehicle 103 is located within the geographic region. As a result, the computational latency of the server 101 in providing or facilitating the execution of the first vehicle function for the first connected vehicle 103 can be reduced, and the reliability of the server 101 in serving the first connected vehicle 103 can be improved.

Referring back to FIG. 6, if in block 604, the deployment engine 206 determines that the available resources of the server 101 are not sufficient to deploy all first vehicle functions associated with the connected vehicles 103 for the connected vehicles 103 that will be in the geographic region at the future point in time, the method 600 may proceed to block 608. In block 608, the deployment engine 206 may determine a priority level for the first vehicle functions associated with the connected vehicles 103 based on the connected vehicle status of the geographic region. In some embodiments, each first vehicle function may be associated with one or more connected vehicles 103 in the connected vehicles 103 that will be in the geographic region at the future point in time. To determine the priority level for the first vehicle function, for each pair of the first vehicle function associated with a connected vehicle 103, the deployment engine 206 may determine a priority level corresponding to the first vehicle function and the connected vehicle 103.

To determine the priority level corresponding to the first vehicle function and the connected vehicle 103, the deployment engine 206 may determine a number of first connected vehicles 103 associated with the same first vehicle function in the geographic region at the future point in time (e.g., 75 connected vehicles) among the number of connected vehicles 103 in the geographic region at the future point in time (e.g., 400 connected vehicles). Because the deployment engine 206 may deploy the same first vehicle function for these first connected vehicles 103, the deployment engine 206 may use at least one or more operating parameters of the first vehicle function that are computed for the first connected vehicle 103 (e.g., average roadway speed of at least one or more road segments, driving score of at least one or more vehicles, etc.) in deploying the first vehicle function for other first connected vehicles 103 without re-computing these one or more operating parameters. In some embodiments, the deployment engine 206 may determine the priority level corresponding to the first vehicle function and the connected vehicle 103 to be directly proportional to the number of first connected vehicles 103 associated with the same first vehicle function.

In some embodiments, the deployment engine 206 may determine the priority level corresponding to the first vehicle function and the connected vehicle 103 based on the enter time and the serving duration of the first connected vehicle 103. The deployment engine 206 may determine the time distance between the current timestamp and the enter time of the first connected vehicle 103, and determine the priority level corresponding to the first vehicle function and the connected vehicle 103 to be directly proportional to this time distance. Thus, the deployment engine 206 may prioritize the vehicle function for the connected vehicle 103 that has been within the geographic region for a longer time period as compared to other connected vehicles 103. In some embodiments, the deployment engine 206 may determine the priority level corresponding to the first vehicle function and the connected vehicle 103 to be inversely proportional to the serving duration of the first connected vehicle 103 in the geographic region. Thus, the deployment engine 206 may prioritize the vehicle function for the connected vehicle 103 that will be in the geographic region for a relatively short time period as compared to other connected vehicles 103.

In some embodiments, the deployment engine 206 may determine the priority level corresponding to the first vehicle function and the connected vehicle 103 based on the vehicle priority metric of the first connected vehicle 103 and/or the urgency metric of the first vehicle function. In some embodiments, the deployment engine 206 may determine the priority level corresponding to the first vehicle function and the connected vehicle 103 to be directly proportional to the vehicle priority metric of the first connected vehicle 103 and/or the urgency metric of the first vehicle function. Thus, the deployment engine 206 may prioritize the vehicle function for the connected vehicle 103 that has relatively high priority metric as compared to other connected vehicles 103 (e.g., ambulances, fire trucks, etc.). The deployment engine 206 may also prioritize the vehicle function for the connected vehicle 103 in which the vehicle function has relatively high urgency metric as compared to other vehicle functions (e.g., the function to increase traffic safety may be more urgent than the function to maximize fuel efficiency, etc.). In some embodiments, the deployment engine 206 may assign an adjustable weight value for each factor being used to determine the priority level corresponding to the first vehicle function and the connected vehicle 103. Other factors for determining the priority level corresponding to the first vehicle function and the connected vehicle 103 are also possible and contemplated.

In block 610, because the available resources of the server 101 are insufficient to deploy all first vehicle functions associated with the connected vehicles 103 for the connected vehicles 103 that will be in the geographic region at the future point in time, the deployment engine 206 may determine from the first vehicle functions one or more vehicle functions to be deployed by the server 101 based on the priority level of the first vehicle functions. In some embodiments, the deployment engine 206 may select from the first vehicle functions and the connected vehicles 103 associated with first vehicle functions one or more function-vehicle pairs including a vehicle function and a connected vehicle 103 associated with the vehicle function that have the highest priority level corresponding to the vehicle function and the connected vehicle 103, and the available resources of the server 101 are sufficient to deploy these vehicle functions for these connected vehicles 103. Alternatively, the deployment engine 206 may select one or more function-vehicle pairs including a vehicle function and a connected vehicle 103 associated with the vehicle function in which the priority level corresponding to the vehicle function and the connected vehicle 103 satisfies a priority level threshold (e.g., higher than 0.75), and the available resources of the server 101 are sufficient to deploy these vehicle functions for these connected vehicles 103. The deployment engine 206 may determine these function-vehicle pairs to be the vehicle functions associated with the connected vehicles 103 selected for deployment.

In block 612, for each vehicle function associated with a connected vehicle 103 selected for deployment, the server 101 may deploy the vehicle function for the connected vehicle 103 using the available resources of the server 101. In some embodiments, the deployment engine 206 may deploy the vehicle function for the connected vehicle 103 in similar manner as discussed above with reference to block 606. In some embodiments, the deployment engine 206 may deploy multiple vehicle functions associated with connected vehicles 103 based on the priority level corresponding to the vehicle function and the connected vehicle 103. For example, the deployment engine 206 may deploy the vehicle functions associated with the connected vehicles 103 in the decreasing order of their priority level. Alternatively, the deployment engine 206 may deploy the vehicle functions associated with the connected vehicles 103 in the increasing order of their priority level. Other implementations for deploying the vehicle functions based on the priority level are also possible and contemplated.

In some embodiments, the deployment engine 206 may determine one or more second vehicle functions that are not deployed by the server 101 from the first vehicle functions associated with the connected vehicles 103 that will be in the geographic region at the future point in time. Similar to determining the vehicle functions associated with the connected vehicles 103 that are deployed by the server 101, the deployment engine 206 may determine the second vehicle functions that are not deployed by the server 101 based on the priority level corresponding to the second vehicle function and the connected vehicle 103 associated with second vehicle function. In some embodiments, the deployment engine 206 may select one or more function-vehicle pairs including a vehicle function and a connected vehicle 103 associated with the vehicle function that have the lowest priority level corresponding to the vehicle function and the connected vehicle 103, and the available resources of the server 101 are insufficient to deploy these vehicle functions for these connected vehicles 103 in addition the vehicle functions associated with the connected vehicles 103 selected for deployment. Alternatively, the deployment engine 206 may select one or more function-vehicle pairs including a vehicle function and a connected vehicle 103 associated with the vehicle function in which the priority level corresponding to the vehicle function and the connected vehicle 103 does not satisfy the priority level threshold (e.g., lower than 0.75), and the available resources of the server 101 are insufficient to deploy these vehicle functions for these connected vehicles 103 in addition the vehicle functions associated with the connected vehicles 103 selected for deployment. The deployment engine 206 may determine these function-vehicle pairs to be the second vehicle functions associated with the second connected vehicles 103 unselected for deployment.

In some embodiments, for a second vehicle function associated with a second connected vehicle 103 unselected for deployment, the deployment engine 206 may request the second connected vehicle 103 to select a different vehicle function. As an example, the second vehicle function may be to increase traffic safety and the server 101 may not have enough resources available to deploy the second vehicle function for the second connected vehicle 103. However, due to the deployment of the function to minimize travel time for multiple other connected vehicles 103, at least one or more operating parameters associated with the function to minimize travel time may be used in deploying this vehicle function for the second connected vehicle 103 without re-computing these operating parameters (e.g., average roadway speed of at least one or more road segments, etc.). Therefore, the server 101 may have enough resources available to deploy the function to minimize travel time for the second connected vehicle 103. In this example, the deployment engine 206 may transmit a function substitute request to the second connected vehicle 103 requesting the second connected vehicle 103 to select the function to minimize travel time instead of the function to increase traffic safety that the second connected vehicle 103 usually prefers. The deployment engine 206 may receive a response to the function substitute request from the second connected vehicle 103, and determine whether the second connected vehicle 103 selects the function to minimize travel time. If the second connected vehicle 103 selects the function to minimize travel time, the deployment engine 206 may deploy the function to minimize travel time for the second connected vehicle 103 prior to the future point in time at which the second connected vehicle 103 will be in the geographic region of the server 101.

In some embodiments, for a second vehicle function associated with a second connected vehicle 103 unselected for deployment, the deployment engine 206 may request the second connected vehicle 103 to select a different option of the second vehicle function. As an example, the second vehicle function may be the function to increase traffic safety and the server 101 may not have enough available resources to compute the driving score for each vehicle located within the geographic region. However, the server 101 may have enough available resources to compute the average driving score for the vehicles located on each road segment of the geographic region, because this option is less computationally intensive. In this example, the deployment engine 206 may transmit an option substitute request to the second connected vehicle 103 requesting the second connected vehicle 103 to select the option to only compute the average driving score for each road segment instead of the option to compute the driving score for each individual vehicle in the geographic region. The deployment engine 206 may receive a response to the option substitute request from the second connected vehicle 103, and determine whether the second connected vehicle 103 selects the option to compute the average driving score for each road segment. If the second connected vehicle 103 selects the option to compute the average driving score for each road segment, the deployment engine 206 may perform this option in deploying the function to increase traffic safety for the second connected vehicle 103 prior to the future point in time at which the second connected vehicle 103 will be in the geographic region of the server 101.

In some embodiments, for a second vehicle function associated with a second connected vehicle 103 unselected for deployment, the deployment engine 206 may communicate with other servers 101 and determine one or more servers 101 that have enough resources available to deploy the second vehicle function for the second connected vehicle 103. In some embodiments, the deployment engine 206 may generate a server substitute request including the server ID, the region data describing the geographic region, etc., associated with these servers 101, and transmit the server substitute request to the second connected vehicle 103. The server substitute request may request the second connected vehicle 103 to select a different server 101 that has sufficient available resources to provide or facilitate the execution of the second vehicle function for the second connected vehicle 103. In some embodiments, responsive to receiving the server substitute request, the second connected vehicle 103 may select a different server 101, and adjust its vehicle route to proceed through the geographic region of the different server 101. In some embodiments, the deployment engine 206 may receive the response to the server substitute request from the second connected vehicle 103, determine the different server 101 selected by the second connected vehicle 103, and notify the different server 101 about the second connected vehicle 103 approaching the geographic region of the different server 101. The different server 101 may deploy the second vehicle function for the second connected vehicle 103 prior to a future point in time at which the second connected vehicle 103 will be located within the geographic region of the different server 101 as discussed elsewhere herein.

In some embodiments, the deployment engine 206 may transmit the function substitute request, the option substitute request, and/or the server substitute request to the second connected vehicle 103 before the second connected vehicle 103 enters the geographic region of the server 101. This implementation is advantageous, because it enables the server 101 to adjust its deployment of vehicle functions for the second connected vehicle 103 with a different vehicle functions or with a different option of the second vehicle function. This implementation also enables a different server 101 to perform the early deployment of the second vehicle function for the second connected vehicle 103 if necessary. As a result, the function data of the vehicle function associated with the second connected vehicle 103 may be ready for the execution of the vehicle function when the second connected vehicle 103 is located within the geographic region of the server 101 or within the geographic region of the different server 101.

Figure 8:
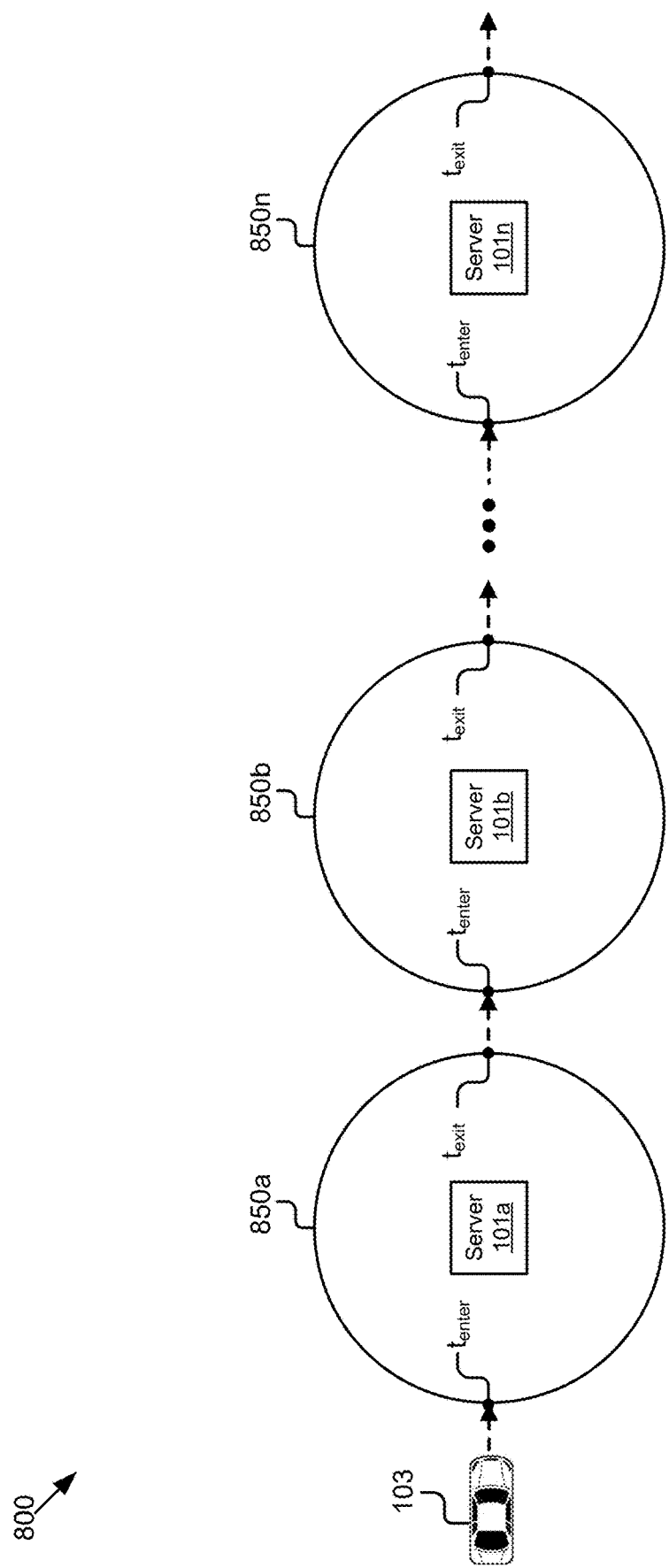
FIG. 8 illustrates an example scenario in which a connected vehicle travels through multiple geographic regions of multiple servers.

FIG. 8 illustrates an example scenario 800 in which a connected vehicle 103 may proceed through multiple geographic regions 850 of multiple servers 101 as the connected vehicle 103 travel along its vehicle route. As discussed elsewhere herein, each server 101 may utilize its available resources to deploy the vehicle function associated with the connected vehicle 103 (e.g., the function to minimize travel time) before the corresponding enter time $t_{enter}$ at which the connected vehicle 103 may enter the geographic region 850 of the server 101. As a result, the operating parameters of the vehicle function associated with the connected vehicle 103 (e.g., the average roadway speed, the average lane speed, the traffic signal duration, etc.) may be promptly available for the server 101 or the connected vehicle 103 to execute the vehicle function for the connected vehicle 103 when the connected vehicle 103 is located within the geographic region 850 of the server 101. By proactively deploying the vehicle function for the connected vehicle 103 in advance using the available resource of the server 101, the server 101 may reduce the amount of computational resources needed at the execution time of the vehicle function, decrease the computational latency in providing or supporting the execution of the vehicle function for the connected vehicle 103, and efficiently utilize its available resources in preparation for the upcoming connected vehicle 103. As a result, the reliability and performance quality of the server 101 in serving the connected vehicles 103 can be significantly improved.

Figure 7B:
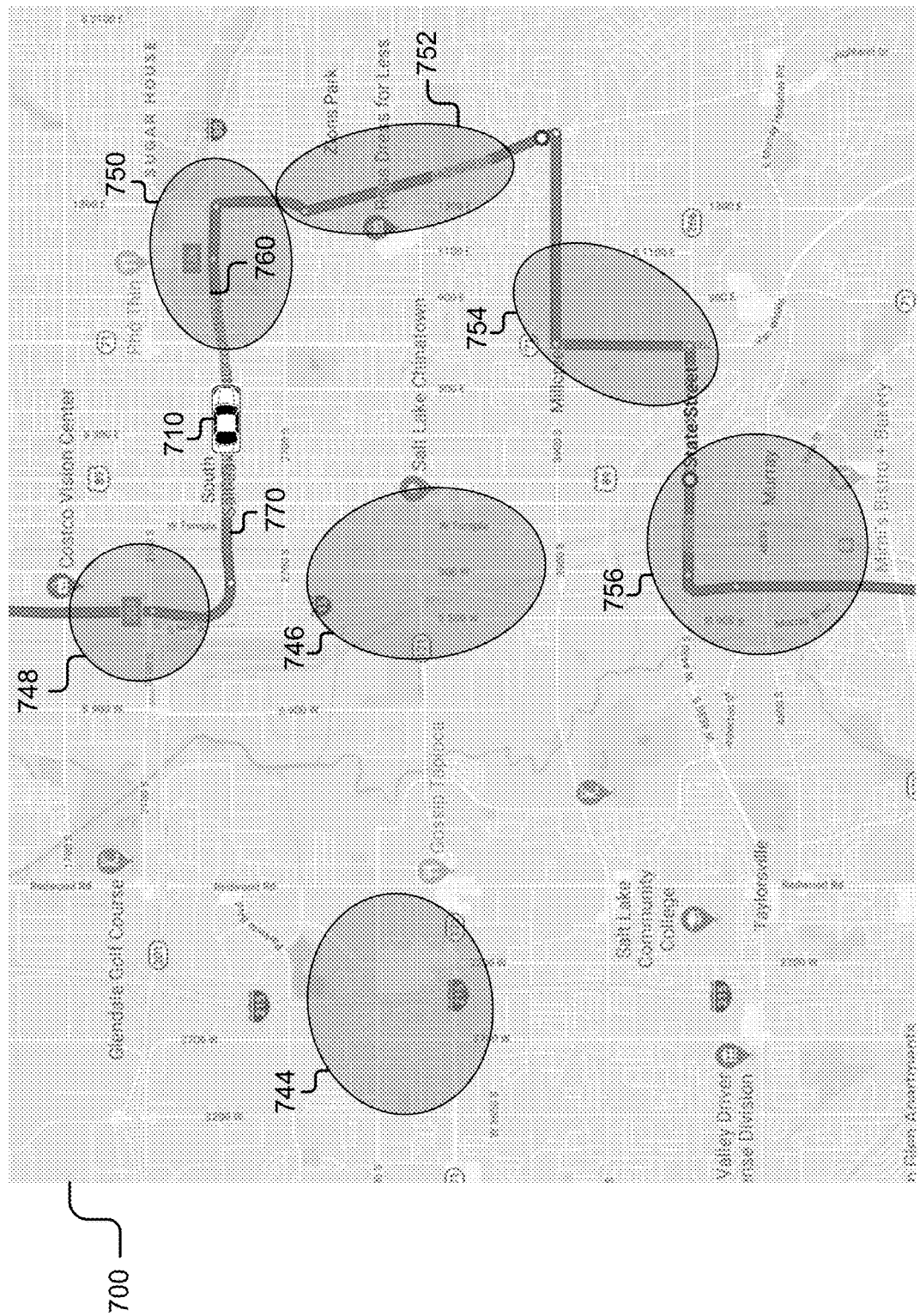
FIG. 7B illustrates a roadway area including multiple geographic regions of multiple servers.

As an example, FIG. 7B illustrates a larger view of the roadway area 700 in FIG. 7A. As depicted in FIG. 7B, the roadway area 700 may include multiple geographic regions 744, 746, 748, 750, 752, 754, 756 associated with multiple servers 101. As discussed elsewhere herein, these servers 101 may be central servers and/or local servers and may be located remotely from or proximate to the roadway area 700. In the example depicted in FIGS. 7A and 7B, as the connected vehicle 710 travels along its vehicle route 770, the connected vehicle 710 may proceed through the geographic regions 748, 750, 752, 754, 756 of first servers 101 among the multiple servers 101. In this example, the vehicle function associated with the connected vehicle 710 may be the function to increase traffic safety. Each first server 101 may utilize its available resources to deploy the function to increase traffic safety for the connected vehicle 710 before the corresponding enter time $t_{enter}$ at which the connected vehicle 710 may enter its geographic region. As a result, the operating parameters of the function to increase traffic safety (e.g., driving pattern and/or driving score of various vehicles located on the road segments within the geographic region, situation location and impact zone of the traffic situations in the geographic region, etc.) may be promptly available when the connected vehicle 710 is located within the geographic region of the first server 101. Therefore, the first server 101 and/or the connected vehicle 710 may execute the function to increase traffic safety using these operating parameters with minimum delay, thereby quickly determining the optimal road segments for the connected vehicle 710 to safely proceed through the geographic region of the first server 101.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above description. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method, comprising:
receiving vehicle data for a plurality of vehicles associated with a geographic region;
predicting, based on the vehicle data, a connected vehicle status of the geographic region, the connected vehicle status reflecting an estimated number of connected vehicles in the geographic region at a future point in time;
determining, based on the estimated number of connected vehicles, one or more vehicle functions to be deployed at the future point in time to a first connected vehicle of the plurality of vehicles associated with the geographic region by a server associated with the geographic region, the first connected vehicle being communicatively coupled with the server at the future point in time;
processing, by the server associated with the geographic region, data for deploying the one or more vehicle functions in advance of the future point in time; and
deploying, by the server, the one or more vehicle functions to the first connected vehicle at the future point in time when the first connected vehicle is in the geographic region.

2. The method of claim 1, wherein deploying the one or more vehicle functions includes:
computing, by the server prior to the future point in time, an operating parameter for a first vehicle function from the one or more vehicle functions, the first vehicle function associated with the first connected vehicle from the plurality of vehicles.

3. The method of claim 2, further comprising:
determining that the first connected vehicle is within the geographic region; and
transmitting function data including the operating parameter associated with the first vehicle function to the first connected vehicle for executing the first vehicle function based on the operating parameter.

4. The method of claim 2, wherein the first vehicle function and the operating parameter associated with the first vehicle function include one or more of:
the first vehicle function is a function to minimize travel time and the operating parameter includes one or more of:
an average roadway speed associated with one or more road segments,
an average lane speed associated with one or more lanes, and
a traffic signal duration associated with one or more intersections; and
the first vehicle function is a function to increase traffic safety and the operating parameter includes one or more of:
a driving pattern or a driving score of one or more vehicles located on the one or more road segments, and
a situation location and an impact zone of one or more traffic situations in the geographic region.

5. The method of claim 1, wherein:
predicting the connected vehicle status of the geographic region includes estimating a vehicle dynamic of the first connected vehicle in the geographic region; and
deploying the one or more vehicle functions includes computing function data for a first vehicle function associated with the first connected vehicle based on the estimated vehicle dynamic of the first connected vehicle in the geographic region.

6. The method of claim 5, wherein:
the estimated vehicle dynamic of the first connected vehicle includes one or more of a travel path of the first connected vehicle in the geographic region, an estimated vehicle speed and an estimated vehicle location of the first connected vehicle in the geographic region at one or more timestamps.

7. The method of claim 1, wherein:
the plurality of vehicles associated with the geographic region includes one or more vehicles located in the geographic region and one or more vehicles located within a predefined distance from the geographic region; and
predicting the connected vehicle status of the geographic region includes:
determining, based on the vehicle data associated with the plurality of vehicles, one or more connected vehicles that will be in the geographic region at the future point in time; and
determining the estimated number of connected vehicles in the geographic region at the future point in time based on the one or more connected vehicles.

8. The method of claim 1, wherein predicting the connected vehicle status of the geographic region includes:
estimating, based on the vehicle data associated with the plurality of vehicles, a future traffic condition of one or more road segments associated with the geographic region;
receiving trip data of the first connected vehicle in the plurality of vehicles, the trip data including a vehicle route and a departure time of the first connected vehicle; and
estimating, based on the future traffic condition of the one or more road segments and the trip data of the first connected vehicle, one or more of an enter time, an exit time, a serving duration, and a vehicle dynamic of the first connected vehicle in the geographic region.

9. The method of claim 1, further comprising:
determining one or more first vehicle functions for one or more connected vehicles in the geographic region of the server at the future point in time;
determining a priority level for a first vehicle function in one or more first vehicle functions based on one or more of:
a number of connected vehicles associated with the first vehicle function in the geographic region at the future point in time,
an enter time and a serving duration in the geographic region of the first connected vehicle associated with the first vehicle function, and
a vehicle priority metric of the first connected vehicle and an urgency metric of the first vehicle function; and
determining, from the one or more first vehicle functions, the one or more vehicle functions to be deployed by the server based on the priority level of the first vehicle function.

10. The method of claim 1, wherein determining the one or more vehicle functions to be deployed by the server includes:
determining that a second vehicle function is not deployed by the server based on a priority level of the second vehicle function; and
requesting one or more second connected vehicles associated with the second vehicle function to select one or more of a different option of the second vehicle function and a different vehicle function.

11. A system comprising:
one or more processors; and
one or more memories storing instructions that, when executed by the one or more processors, cause the system to perform operations including:
receiving vehicle data for a plurality of vehicles associated with a geographic region;
predicting, based on the vehicle data, a connected vehicle status of the geographic region, the connected vehicle status reflecting an estimated number of connected vehicles in the geographic region at a future point in time;
determining, based on the estimated number of connected vehicles, one or more vehicle functions to be deployed at the future point in time to a first connected vehicle of the plurality of vehicles associated with the geographic region by a server associated with the geographic region, the first connected vehicle being communicatively coupled with the server at the future point in time;
processing, by the server associated with the geographic region, data for deploying the one or more vehicle functions in advance of the future point in time; and
deploying, by the server, the one or more vehicle functions to the first connected vehicle when the first connected vehicle is in the geographic region.

12. The system of claim 11, wherein deploying the one or more vehicle functions includes:
computing, by the server prior to the future point in time, an operating parameter for a first vehicle function from the one or more vehicle functions, the first vehicle function associated with the first connected vehicle from the plurality of vehicles.

13. The system of claim 12, wherein the one or more processors are configured to perform the operations including:
determining that the first connected vehicle is within the geographic region; and
transmitting function data including the operating parameter associated with the first vehicle function to the first connected vehicle for executing the first vehicle function based on the operating parameter.

14. The system of claim 12, wherein the first vehicle function and the operating parameter associated with the first vehicle function include one or more of:
the first vehicle function is a function to minimize travel time and the operating parameter includes one or more of:
an average roadway speed associated with one or more road segments,
an average lane speed associated with one or more lanes, and
a traffic signal duration associated with one or more intersections; and
the first vehicle function is a function to increase traffic safety and the operating parameter includes one or more of:
a driving pattern or a driving score of one or more vehicles located on the one or more road segments, and
a situation location and an impact zone of one or more traffic situations in the geographic region.

15. The system of claim 11, wherein:
predicting the connected vehicle status of the geographic region includes estimating a vehicle dynamic of the first connected vehicle in the geographic region; and
deploying the one or more vehicle functions includes computing function data for a first vehicle function associated with the first connected vehicle based on the estimated vehicle dynamic of the first connected vehicle in the geographic region.

16. The system of claim 15, wherein:
the estimated vehicle dynamic of the first connected vehicle includes one or more of a travel path of the first connected vehicle in the geographic region, an estimated vehicle speed and an estimated vehicle location of the first connected vehicle in the geographic region at one or more timestamps.

17. The system of claim 11, wherein predicting the connected vehicle status of the geographic region includes:
estimating, based on the vehicle data associated with the plurality of vehicles, a future traffic condition of one or more road segments associated with the geographic region;
receiving trip data of the first connected vehicle in the plurality of vehicles, the trip data including a vehicle route and a departure time of the first connected vehicle; and
estimating, based on the future traffic condition of the one or more road segments and the trip data of the first connected vehicle, one or more of an enter time, an exit time, a serving duration, and a vehicle dynamic of the first connected vehicle in the geographic region.

18. The system of claim 11, wherein the one or more processors are configured to perform the operations including:
determining one or more first vehicle functions for one or more connected vehicles in the geographic region of the server at the future point in time;
determining a priority level for a first vehicle function in one or more first vehicle functions based on one or more of:
a number of connected vehicles associated with the first vehicle function in the geographic region at the future point in time,
an enter time and a serving duration in the geographic region of the first connected vehicle associated with the first vehicle function, and
a vehicle priority metric of the first connected vehicle and an urgency metric of the first vehicle function; and
determining, from the one or more first vehicle functions, the one or more vehicle functions to be deployed by the server based on the priority level of the first vehicle function.

19. The system of claim 11, wherein determining the one or more vehicle functions to be deployed by the server includes:
determining that a second vehicle function is not deployed by the server based on a priority level of the second vehicle function; and
requesting one or more second connected vehicles associated with the second vehicle function to select one or more of a different option of the second vehicle function and a different vehicle function.

20. A system comprising:
means for receiving, by a function deployment control, vehicle data for a plurality of vehicles associated with a geographic region, the function deployment control including logic executed on one or more processors of one or more computing devices;

means for predicting, by the function deployment control, based on the vehicle data, a connected vehicle status of the geographic region, the connected vehicle status reflecting an estimated number of connected vehicles in the geographic region at a future point in time;

means for determining, by the function deployment control, based on the estimated number of connected vehicles, one or more vehicle functions to be deployed at the future point in time to a first connected vehicle of the plurality of vehicles associated with the geographic region by a server associated with the geographic region, the first connected vehicle being communicatively coupled with the server at the future point in time;

means for processing, by the function deployment control at the server associated with the geographic region, data for deploying the one or more vehicle functions in advance of the future point in time; and means for deploying, by the function deployment control at the server, the one or more vehicle functions when the first connected vehicle is in the geographic region.

* * * * *